US012106708B2

(12) United States Patent
He

(10) Patent No.: US 12,106,708 B2
(45) Date of Patent: Oct. 1, 2024

(54) BACKPLANE CONFIGURATIONS AND OPERATIONS

(71) Applicant: GOOGLE LLC, Mountain View, CA (US)

(72) Inventor: Gang He, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/357,707

(22) Filed: Jul. 24, 2023

(65) Prior Publication Data

US 2024/0029640 A1 Jan. 25, 2024

Related U.S. Application Data

(63) Continuation of application No. 16/739,740, filed on Jan. 10, 2020, now Pat. No. 11,710,445.

(Continued)

(51) Int. Cl.
*G09G 3/32* (2016.01)

(52) U.S. Cl.
CPC ........... *G09G 3/32* (2013.01); *G09G 2300/06* (2013.01); *G09G 2300/0842* (2013.01); *G09G 2320/0673* (2013.01); *G09G 2330/021* (2013.01)

(58) Field of Classification Search
CPC ...... G09G 3/32; G09G 3/3233; G09G 3/2011; G09G 3/2014; G09G 2330/021;

(Continued)

(56) References Cited

U.S. PATENT DOCUMENTS 2,403,731 A 7/1946 Macneille
3,936,817 A 2/1976 Levy et al.

(Continued)

FOREIGN PATENT DOCUMENTS

CN 1346121 A 4/2002
CN 103971633 A 8/2014

(Continued)

OTHER PUBLICATIONS

International Search Report and Written Opinion for PCT Apn No. PCT/US2020/014050, Jul. 20, 2020, 23 pages.

(Continued)

*Primary Examiner* — Mark Edwards
(74) *Attorney, Agent, or Firm* — Brake Hughes Bellermann LLP

(57) ABSTRACT

The disclosure describes various aspects of backplanes, including unit cells, architectures, and operations. In an aspect, a backplane unit cell is described that includes first and second switches, a storage element, a comparator, a source (e.g., a current or voltage source), where the source generates a drive signal to control light emission of a selected one of the light emitting elements in a display, and where the drive signal is based on a power signal selected by the second switch. In another aspect, a device is described that includes a backplane configured in an active matrix topology including multiple data columns and multiple row selects; and a set of electrical contacts associated with the active matrix topology and configured to electrically couple the backplane with the display, the display having multiple light emitting elements configured in a passive matrix topology. Methods of operation of the backplane are also described.

18 Claims, 22 Drawing Sheets

Related U.S. Application Data

(60) Provisional application No. 62/796,394, filed on Jan. 24, 2019.

(58) Field of Classification Search
CPC ....... G09G 2300/06; G09G 2300/0842; G09G 2300/0804; G09G 2300/0833; G09G 2300/0866; G09G 2320/0673; G09G 2310/0259; G09G 2310/066; H01L 27/3244
See application file for complete search history.

(56) References Cited

U.S. PATENT DOCUMENTS

| | | | | |
|---|---|---|---|---|
| 4,432,610 | A | 2/1984 | Kobayashi et al. | |
| 4,825,201 | A | 4/1989 | Watanabe et al. | |
| 4,923,285 | A | 5/1990 | Ogino et al. | |
| 4,996,523 | A | 2/1991 | Bell et al. | |
| 5,018,838 | A | 5/1991 | Barnes et al. | |
| 5,144,418 | A | 9/1992 | Brown et al. | |
| 5,157,387 | A | 10/1992 | Momose et al. | |
| 5,189,406 | A | 2/1993 | Humphries et al. | |
| 5,317,334 | A | 5/1994 | Sano | |
| 5,359,342 | A | 10/1994 | Nakai et al. | |
| 5,471,225 | A | 11/1995 | Parks | |
| 5,473,338 | A | 12/1995 | Prince et al. | |
| 5,497,172 | A | 3/1996 | Doherty et al. | |
| 5,537,128 | A | 7/1996 | Keene et al. | |
| 5,548,347 | A | 8/1996 | Melnik et al. | |
| 5,566,010 | A | 10/1996 | Ishii et al. | |
| 5,602,559 | A | 2/1997 | Kimura | |
| 5,619,228 | A | 4/1997 | Doherty | |
| 5,731,802 | A | 3/1998 | Aras et al. | |
| 5,751,264 | A | 5/1998 | Cavallerano et al. | |
| 5,767,832 | A | 6/1998 | Koyama et al. | |
| 5,818,413 | A | 10/1998 | Hayashi et al. | |
| 5,905,482 | A | 5/1999 | Hughes et al. | |
| 5,926,158 | A | 7/1999 | Yoneda et al. | |
| 5,926,162 | A | 7/1999 | Wood et al. | |
| 5,936,603 | A | 8/1999 | Lippmann et al. | |
| 5,936,604 | A | 8/1999 | Endou | |
| 5,945,972 | A | 8/1999 | Okumura et al. | |
| 5,959,598 | A | 9/1999 | Mcknight | |
| 5,969,512 | A | 10/1999 | Matsuyama | |
| 5,969,701 | A | 10/1999 | Numao et al. | |
| 5,977,940 | A | 11/1999 | Akiyama et al. | |
| 5,986,640 | A | 11/1999 | Baldwin et al. | |
| 6,005,558 | A | 12/1999 | Hudson et al. | |
| 6,034,659 | A | 3/2000 | Wald et al. | |
| 6,046,716 | A | 4/2000 | Mcknight | |
| 6,067,065 | A | 5/2000 | Worley et al. | |
| 6,121,948 | A | 9/2000 | Worley et al. | |
| 6,127,991 | A | 10/2000 | Uehara et al. | |
| 6,144,356 | A | 11/2000 | Weatherford et al. | |
| 6,151,011 | A | 11/2000 | Worley et al. | |
| RE37,056 | E | 2/2001 | Wortel et al. | |
| 6,201,521 | B1 | 3/2001 | Doherty | |
| 6,262,703 | B1 | 7/2001 | Perner | |
| 6,285,360 | B1 | 9/2001 | Li | |
| 6,297,788 | B1 | 10/2001 | Shigeta et al. | |
| 6,317,112 | B1 | 11/2001 | Handschy et al. | |
| 6,320,565 | B1 | 11/2001 | Albu et al. | |
| 6,369,782 | B2 | 4/2002 | Shigeta | |
| 6,424,330 | B1 | 7/2002 | Johnson | |
| 6,456,267 | B1 | 9/2002 | Sato et al. | |
| 6,476,792 | B2 | 11/2002 | Hattori et al. | |
| 6,518,945 | B1 | 2/2003 | Pinkham | |
| 6,525,709 | B1 | 2/2003 | O'Callaghan | |
| 6,567,138 | B1 | 5/2003 | Krusius et al. | |
| 6,587,084 | B1 | 7/2003 | Alymov et al. | |
| 6,603,452 | B1 | 8/2003 | Serita | |
| 6,621,488 | B1 | 9/2003 | Takeuchi et al. | |
| 6,690,432 | B2 | 2/2004 | Janssen et al. | |
| 6,717,561 | B1 | 4/2004 | Pfeiffer et al. | |
| 6,731,306 | B2 | 5/2004 | Booth et al. | |
| 6,744,415 | B2 | 6/2004 | Waterman et al. | |
| 6,762,739 | B2 | 7/2004 | Bone | |
| 6,784,898 | B2 | 8/2004 | Lee et al. | |
| 6,788,231 | B1 | 9/2004 | Hsueh | |
| 6,806,871 | B1 | 10/2004 | Yasue | |
| 6,831,626 | B2 | 12/2004 | Nakamura et al. | |
| 6,850,216 | B2 | 2/2005 | Akimoto et al. | |
| 6,862,012 | B1 | 3/2005 | Funakoshi et al. | |
| 6,924,824 | B2 | 8/2005 | Adachi et al. | |
| 6,930,667 | B1 | 8/2005 | Iijima et al. | |
| 6,930,692 | B1 | 8/2005 | Coker et al. | |
| 7,002,536 | B2 | 2/2006 | Tam | |
| 7,066,605 | B2 | 6/2006 | Dewald et al. | |
| 7,067,853 | B1 | 6/2006 | Yao | |
| 7,071,906 | B2 | 7/2006 | Nishitani et al. | |
| 7,088,325 | B2 | 8/2006 | Ishii | |
| 7,088,329 | B2 | 8/2006 | Hudson | |
| 7,129,920 | B2 | 10/2006 | Chow | |
| 7,187,355 | B2 | 3/2007 | Tam et al. | |
| 7,379,043 | B2 | 5/2008 | Worley et al. | |
| 7,397,980 | B2 | 7/2008 | Frisken | |
| 7,443,374 | B2 | 10/2008 | Hudson | |
| 7,468,717 | B2 | 12/2008 | Hudson | |
| 7,554,514 | B2 | 6/2009 | Nozawa | |
| 7,692,671 | B2 | 4/2010 | Ng | |
| 7,852,307 | B2 | 12/2010 | Hudson | |
| 7,990,353 | B2 | 8/2011 | Chow | |
| 8,040,311 | B2 | 10/2011 | Hudson et al. | |
| 8,111,271 | B2 | 2/2012 | Hudson et al. | |
| 8,264,507 | B2 | 9/2012 | Hudson et al. | |
| 8,421,828 | B2 | 4/2013 | Hudson et al. | |
| 8,643,681 | B2 | 2/2014 | Endo et al. | |
| 9,007,280 | B2 | 4/2015 | Kwak | |
| 9,047,818 | B1 | 6/2015 | Day et al. | |
| 9,117,746 | B1 | 8/2015 | Clark et al. | |
| 9,159,262 | B2 | 10/2015 | Kikuchi et al. | |
| 9,406,269 | B2 | 8/2016 | Lo et al. | |
| 9,583,031 | B2 | 2/2017 | Hudson et al. | |
| 9,824,619 | B2 | 11/2017 | Hudson et al. | |
| 9,918,053 | B2 | 3/2018 | Lo et al. | |
| 10,002,565 | B2 | 6/2018 | Kikuchi et al. | |
| 10,157,578 | B2 | 12/2018 | Kikuchi et al. | |
| 10,229,630 | B2 | 3/2019 | Lau et al. | |
| 10,437,402 | B1 | 10/2019 | Pan | |
| 10,615,786 | B2 | 4/2020 | Sugiyama et al. | |
| 10,957,272 | B2 | 3/2021 | Li et al. | |
| 2001/0013844 | A1 | 8/2001 | Shigeta | |
| 2002/0024481 | A1 | 2/2002 | Kawabe et al. | |
| 2002/0041266 | A1 | 4/2002 | Koyama et al. | |
| 2002/0043610 | A1 | 4/2002 | Lee et al. | |
| 2002/0047817 | A1* | 4/2002 | Tam ..................... | G09G 3/3258 345/76 |
| 2002/0135309 | A1 | 9/2002 | Okuda | |
| 2002/0140662 | A1 | 10/2002 | Igarashi | |
| 2002/0158825 | A1 | 10/2002 | Endo et al. | |
| 2003/0058195 | A1 | 3/2003 | Adachi et al. | |
| 2003/0156102 | A1 | 8/2003 | Kimura | |
| 2003/0174117 | A1 | 9/2003 | Crossland et al. | |
| 2003/0210257 | A1 | 11/2003 | Hudson et al. | |
| 2004/0032636 | A1 | 2/2004 | Willis | |
| 2004/0080482 | A1 | 4/2004 | Magendanz et al. | |
| 2004/0125090 | A1 | 7/2004 | Hudson | |
| 2004/0174328 | A1 | 9/2004 | Hudson | |
| 2005/0001794 | A1 | 1/2005 | Nakanishi et al. | |
| 2005/0001806 | A1 | 1/2005 | Ohmura | |
| 2005/0052437 | A1 | 3/2005 | Hudson | |
| 2005/0057466 | A1 | 3/2005 | Sala et al. | |
| 2005/0062765 | A1 | 3/2005 | Hudson | |
| 2005/0088462 | A1 | 4/2005 | Borel | |
| 2005/0156828 | A1 | 7/2005 | Yamashita et al. | |
| 2005/0195894 | A1 | 9/2005 | Kim et al. | |
| 2005/0200300 | A1 | 9/2005 | Yumoto | |
| 2005/0259142 | A1 | 11/2005 | Kwak | |
| 2005/0264586 | A1 | 12/2005 | Kim | |
| 2006/0012589 | A1 | 1/2006 | Hsieh et al. | |
| 2006/0012594 | A1 | 1/2006 | Worley et al. | |
| 2006/0066645 | A1 | 3/2006 | Ng | |
| 2006/0147146 | A1 | 7/2006 | Voigt et al. | |
| 2006/0208961 | A1 | 9/2006 | Nathan et al. | |

(56) References Cited

U.S. PATENT DOCUMENTS

| | | | | |
|---|---|---|---|---|
| 2006/0284903 | A1 | 12/2006 | Ng | |
| 2006/0284904 | A1 | 12/2006 | Ng | |
| 2007/0252855 | A1 | 11/2007 | Hudson | |
| 2007/0252856 | A1 | 11/2007 | Hudson et al. | |
| 2008/0007576 | A1 | 1/2008 | Ishii et al. | |
| 2008/0088613 | A1 | 4/2008 | Hudson et al. | |
| 2008/0158437 | A1 | 7/2008 | Arai et al. | |
| 2008/0259019 | A1 | 10/2008 | Ng | |
| 2009/0027360 | A1 | 1/2009 | Kwan et al. | |
| 2009/0027364 | A1 | 1/2009 | Kwan et al. | |
| 2009/0115703 | A1 | 5/2009 | Cok | |
| 2009/0284671 | A1 | 11/2009 | Leister | |
| 2009/0303248 | A1 | 12/2009 | Ng | |
| 2010/0073270 | A1 | 3/2010 | Ishii et al. | |
| 2010/0123964 | A1 | 5/2010 | Haga | |
| 2010/0214646 | A1 | 8/2010 | Sugimoto et al. | |
| 2010/0253995 | A1 | 10/2010 | Reichelt | |
| 2010/0295836 | A1 | 11/2010 | Matsumoto et al. | |
| 2010/0309100 | A1 | 12/2010 | Cok et al. | |
| 2011/0109299 | A1 | 5/2011 | Chaji et al. | |
| 2011/0109670 | A1 | 5/2011 | Sempel et al. | |
| 2011/0199405 | A1 | 8/2011 | Dallas et al. | |
| 2011/0205100 | A1 | 8/2011 | Bogaerts | |
| 2011/0227887 | A1 | 9/2011 | Dallas et al. | |
| 2012/0086733 | A1 | 4/2012 | Hudson et al. | |
| 2012/0113167 | A1 | 5/2012 | Margerm et al. | |
| 2013/0038585 | A1 | 2/2013 | Kasai | |
| 2013/0308057 | A1 | 11/2013 | Lu et al. | |
| 2014/0085426 | A1 | 3/2014 | Leone et al. | |
| 2014/0092105 | A1 | 4/2014 | Guttag et al. | |
| 2015/0245038 | A1 | 8/2015 | Clatanoff et al. | |
| 2016/0203801 | A1 | 7/2016 | De Groot et al. | |
| 2016/0351130 | A1 | 12/2016 | Kikuchi et al. | |
| 2016/0365055 | A9 | 12/2016 | Hudson et al. | |
| 2017/0039935 | A1 | 2/2017 | Yang et al. | |
| 2018/0061302 | A1 | 3/2018 | Hu et al. | |
| 2018/0182279 | A1 | 6/2018 | Sakariya et al. | |
| 2019/0347994 | A1 | 11/2019 | Lin et al. | |
| 2020/0098307 | A1 | 3/2020 | Li et al. | |
| 2020/0365075 | A1* | 11/2020 | Charbonnier | G09G 3/32 |
| 2021/0201771 | A1 | 7/2021 | Li et al. | |

FOREIGN PATENT DOCUMENTS

| | | | |
|---|---|---|---|
| CN | 105308863 | A | 2/2016 |
| CN | 106469539 | A | 3/2017 |
| EP | 0658870 | A2 | 6/1995 |
| EP | 1187087 | A1 | 3/2002 |
| GB | 2327798 | A | 2/1999 |
| JP | 7049663 | A | 2/1995 |
| JP | 2002116741 | A | 4/2002 |
| JP | 2002189446 | A | 7/2002 |
| JP | 2003223137 | A | 8/2003 |
| JP | 2005300897 | A | 10/2005 |
| JP | 2014202778 | A | 10/2014 |
| JP | 2015152699 | A | 8/2015 |
| KR | 20050111923 | A | 11/2005 |
| TW | 227005 | B | 7/1994 |
| TW | 407253 | B | 10/2000 |
| TW | 418380 | B | 1/2001 |
| TW | 482991 | B | 4/2002 |
| TW | 483282 | B | 4/2002 |
| TW | 541513 | B | 7/2003 |
| TW | 200603192 | A | 1/2006 |
| WO | 0070376 | A1 | 11/2000 |
| WO | 0152229 | A1 | 7/2001 |
| WO | 2007127849 | A2 | 11/2007 |
| WO | 2007127852 | A2 | 11/2007 |

OTHER PUBLICATIONS

"1920 x 1080 Image Sample Structure, Digital Representation and Digital Timing Reference Sequences for Multiple Picture Rates", SMPTE 274M-2005, SMPTE, White Plains, New York, US, 2005, 29 pages.

"2114A 1024 x4 Bit Static RAM", Component Data Catalog, Intel Corp., Santa Clara, CA, USA, 1982, 7 pages.

"Flip-Flops", CSE370, Lecture 14, https://studylib.net/doc/18055423/flip-flops, 17 pages.

"Sony 3D", screen capture from video clip, 2009, 2 pages.

"Westar's Microdisplay Inspection System", Product Description, www.westar.com/mdis, Jan. 2000, 2 pages.

Amon, et al., "PTAT Sensors Based on SJFETs", 10th Mediterranean Electrotechnical Conference, MEleCon, vol. II, 2000, pp. 802-805.

Anderson, et al., "Holographic Data Storage: Science Fiction or Science Fact", Akonia Holographics LLC, presented at Optical Data Storage, 2014, 8 pages.

Armitage, et al., "Introduction to Microdisplays", John Wiley & Sons, 2006, pp. 182-185.

Baker, "CMOS Circuit Design, Layout, and Simulation", IEEE Press Series on Microelectronic Systems, John Wiley & Sons, Inc., Publication, 2010, pp. 614-616.

Campardo, et al., "VLSI-Design of Non-Volatile Memories", Springer, 2005, pp. 183-188.

Colgan, et al., "On-Chip Metallization Layers for Reflective Light Waves", Journal of Research Development, vol. 42, No. 3/4, May-Jul. 1998, pp. 339-345.

Dai, et al., "Characteristics of LCoS Phase-only spatial light modulator and its applications", Optics Communications vol. 238, especially section 3.2, 2004, pp. 269-276.

Drabik, "Optically Interconnected Parallel Processor Arrays", A Thesis, Georgia Institute of Technology, Dec. 1989, pp. 121-126.

Fuller, "Static Random Access Memory-SRAM", Rochester Institute of technology to Microelectronic Engineering, Nov. 18, 2016, pp. 1-39.

Hu, "Complementary MOS (CMOS) Technology", Feb. 13, 2009, pp. 198-200.

Jesacher, et al., "Broadband suppression of the zero diffraction order of an SLM using its extended phase modulation range", Optics Express, vol. 22, No. 14, Jul. 14, 2014, pp. 17590-17599.

Kang, et al., "Digital Driving of TN-LC for WUXGA LCOS Panel", Digest of Technical Papers, Society for Information Display, 2001, pp. 1264-1267.

Nakamura, et al., "Modified drive method for OCB LSD", Proceeding of the International Display Research Conference, Society for Information Display, Campbell, CA, US, 1997, 4 pages.

Ong, "Modern Mos Technology: Processes, Devices, and Design", McGraw-Hill Book Company, 1984, pp. 207-212.

Oton, et al., "Multipoint phase calibration for improved compensation of inherent wavefront distortion in parallel aligned liquid crystal on silicon display", Applied Optics, vol. 46, No. 23, Optical Society of America, 2007, pp. 5667-5679.

Pelgrom, et al., "Matching Properties of MOS Transistors", IEEE Journal of Solid-State Circuits, vol. 23, No. 5, Oct. 1989, 8 pages.

Potter, et al., "Optical correlation using a phase-only liquid crystal over silicon spatial light modulator", SPIE 1564 Opt. Info. Proc. Sys & Arch. III;, 1991, pp. 363-372.

Rabaey, et al., "Digital Integrated Circuits", A Design Perspective, Second Edition, Saurabh Printers Pvt. Ltd, 2016, pp. 138-140.

Rabaey, "The Devices Chapter 3", Jan. 18, 2002, pp. 121-124.

Robinson, et al., "Polarization Engineering for LCD Projection", John Wiley and Sons, Ltd., Chichester, England, 2005, pp. 121-123.

Sloof, et al., "An Improved WXGA LCOS Imager for Single Panel Systems", Proceedings of the Asia Symposium on Information Display, Society for Information Display, Campbell, CA, US, 2004, 4 pages.

Underwood, et al., "Evaluation of an nMOS VLSI array for an adaptive liquid-crystal spatial light modulator", IEEE Proc, v.133 PI.J. No., Feb. 1986, 15 pages.

Wang, "Studies of Liquid Crystal Response Time", University of Central Florida, Doctoral Dissertation, 2005, 128 pages.

Wu, "Discussion #9 MOSFETs", University of California at Berke-

(56) References Cited

OTHER PUBLICATIONS ley College of Engineering Department of Electrical Engineering and Computer Sciences, Spring 2008, pp. 1-7.

* cited by examiner

BACKPLANE CONFIGURATIONS AND OPERATIONS

CROSS REFERENCE TO RELATED APPLICATIONS

This application is a continuation of U.S. application Ser. No. 16/739,740, filed Jan. 10, 2020, which claims the benefit of U.S. Provisional Application No. 62/796,394, filed Jan. 24, 2019, the disclosures of which are incorporated herein by reference in their entireties.

BACKGROUND OF THE DISCLOSURE

Aspects of the present disclosure generally relate to backplanes used with various types of displays, and more specifically, to different backplane unit cells, architectures, and operations that allow for high density displays, including light field displays.

One overlooked aspect in many displays is the backplane technology used to drive the pixels of the main display panel (e.g., array of pixels or individual optical elements). The backplane is a design, assembly, or arrangement of various circuits and/or transistors that are responsible for turning the individual pixels on and off in the display panel, and therefore playing an important role in the overall display resolution, refresh rate, and power consumption.

The number of pixels in future displays is expected to increase considerably compared to current displays, which will present challenges in the backplane technology power consumption and overall bandwidth that can limit the ability to implement displays with very high resolution and pixel count.

Accordingly, techniques and devices that enable backplane technology with low-power consumption and high operating bandwidth to support high resolution displays are desirable.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect of the disclosure, a backplane unit cell for driving light emitting elements in a display is described that includes a first switch configured to select a data signal based on a select signal, a storage element coupled to the first switch and configured to store a value of the data signal in response to the data signal being selected by the first switch, a comparator coupled to the first switch and configured to generate an output based on a comparison of the value stored in the storage element to a value of a reference signal, a second switch coupled to the comparator and configured to receive the output of the comparator to select a power signal and provide as input to a source the power signal in response to the power signal being selected by the second switch, and the source configured to generate a drive signal to control light emission of a selected one of the light emitting elements in the display, the drive signal being based on the power signal, where the source can be a current source or a voltage source.

In another aspect of the disclosure, a device for driving light emitting elements in a display is described that includes a backplane configured in an active matrix topology including multiple data columns and multiple row selects, and a set of electrical contacts associated with the active matrix topology and configured to electrically couple the backplane with the display, the display having multiple light emitting elements configured in a passive matrix topology.

In another aspect of the disclosure, a method of operating a backplane to drive light emitting elements in a display is described that includes sequentially selecting different rows in the backplane and storing, for each of multiple backplane unit cells associated with the different rows in the backplane, a value provided in a corresponding data column at a time the corresponding row in the backplane is selected, and concurrently enabling, after all the different rows in the backplane have been selected and the values stored, application of drive signals based on the stored values to a first row of light emitting elements associated with each of the different rows in the backplane.

In yet another aspect of the disclosure, a method of operating a backplane to drive light emitting elements in a display is described that includes sequentially selecting different rows in the backplane and storing, for each of multiple backplane unit cells associated with the different rows in the backplane, a value provided in a corresponding data column at a time the corresponding row in the backplane is selected; and for each of the different rows in the backplane, after being selected and the corresponding values stored, sequentially enabling the application of drive signals based on the stored values to a first row of light emitting elements associated with the corresponding row in the backplane.

BRIEF DESCRIPTION OF THE DRAWINGS

The appended drawings illustrate only some implementation and are therefore not to be considered limiting of scope.

DETAILED DESCRIPTION

Figure 1A:
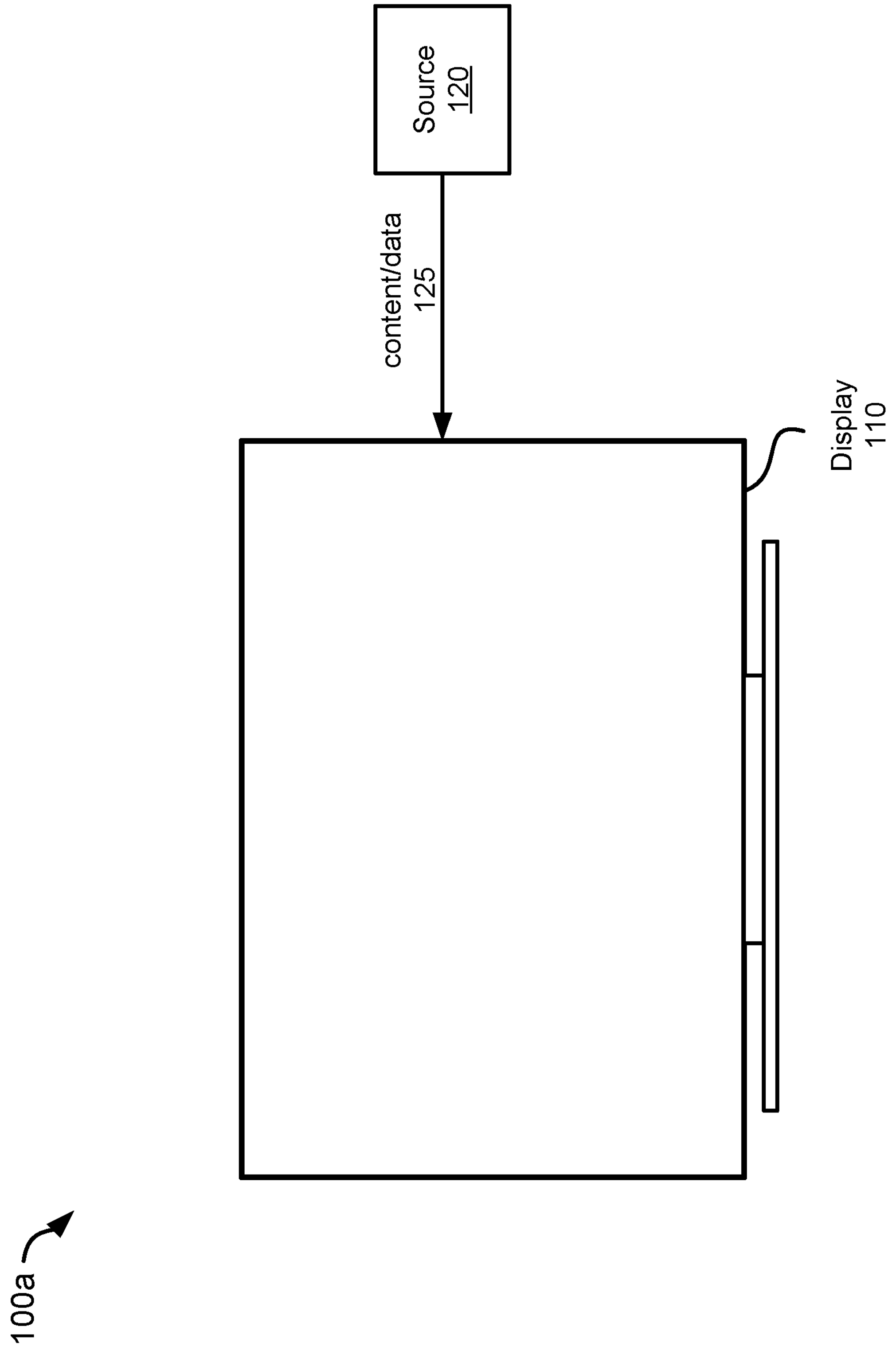
FIG. 1A illustrates an example of a display and a source of content for the display, in accordance with aspects of this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As mentioned above, the number of pixels in future displays is expected to be much greater than in current displays, sometimes orders of magnitude greater. Such displays will present challenges in the type of backplane that is ultimately used, particularly in terms of power consumption and overall bandwidth, as these factors of the backplane can limit the ability to implement displays with very high resolution and extremely large pixel count. Aspects to consider in determining an appropriate backplane include the different backplane technology options as well as the different backplane integration options. Among the backplane technology options to consider there are semiconductor technology options, modulation options, and addressing options.

With respect to the backplane technology options, various possible semiconductor technologies can be considered in connection with this disclosure, including amorphous silicon (a-Si), metal oxides, low temperature polysilicon (LTPS), and complementary metal-oxide-semiconductor (CMOS) wafer. Of these semiconductor technologies, a-Si has the smallest maximum mobility (e.g., 1 $cm^2/V \cdot s$), bandwidth (e.g., 0.1 MHz), common design rule (e.g., 3 μm), and panel size (e.g., 3 m). Next are metal oxide (e.g., 10 $cm^2/V \cdot s$, 1 MHz, 3 μm, and 3 m), LTPS (e.g., 100 $cm^2/V \cdot s$, 10 MHz, 1 μm, and 2 m), and CMOS wafer (e.g., 1400 $cm^2/V \cdot s$, 1000 MHz, 0.18 μm, and 0.3 m). Additionally, a-Si uses current drive for liquid crystal displays (LCDs), while metal oxide, LTPS, and CMOS wafer use current drive for light emitting diodes (LEDs). Moreover, a-Si uses NMOS transistors, has relatively low cost, foundry support is limited, and is typically used for active matrix LCD (AMLCD) display applications. Similarly, metal oxide uses NMOS transistors, has relatively low cost, foundry support is limited, and is typically used for large active matrix organic LED (AMOLED) display applications. In contrast, LTPS uses CMOS, has a medium relative cost, foundry support is limited, and is typically used in mobile AMOLED display applications. Finally, CMOS wafers use CMOS, have a high relative cost, foundry support is available, and are typically used in micro displays.

Of these semiconductor technologies, LTPS and CMOS wafers may offer more flexible options for purposes of backplane bandwidth and density requirements. For example, CMOS wafers can support bandwidths in the range of 1 MHz-1,000 MHz and driver cell pitch in the range 1 μm-30 μm. On the other hand, LTPS can support bandwidths in the range of 1 MHz-15 MHz and driver cell pitch in the range 10 μm-10,000 μm.

There are also various modulation options that can be used in connection with backplane unit cells in a backplane. For example, one possible modulation option is analog modulation (AM), which has simple circuit complexity, low bandwidth requirement, variable current for driving an LED, a smooth grayscale gradient, and no flicker. Other possible modulations include digital modulations, such as binary-coded pulse width modulation (B-PWM), which also has simple circuit complexity, a high bandwidth requirement, a fixed current for driving an LED, potential contouring in a grayscale gradient, and potential flicker. Yet another possible digital modulation option is single pulse width modulation (S-PWM), which has complex circuitry, a high bandwidth requirement, fixed current for driving an LED, a smooth grayscale gradient, and potential flicker. In addition, the present disclosure proposes yet another possible modulation option, which is described as a high dynamic range (HDR) pulse width modulation (HDR-PWM or H-PWM). This proposed modulation option has very complex circuitry, but lower bandwidth requirements than B-PWM or S-PWM, reduced current for driving an LED at low light, a smooth grayscale gradient, and potential flicker. This type of modulation in a backplane unit cell may be useful for displays that require high bandwidths and low power consumption. Additional details regarding these modulation options are provided below in connection with FIGS. 6A-9C.

Moreover, there are various backplane addressing options also to be considered. For example, passive matrix addressing uses a row-by-row scan of pixels and active matrix drives all of the pixels at the same time. The present disclosure proposes an hybrid of these two in which active and passive schemes are combined. Additional details regarding these addressing options are provided below in connection with FIGS. 10A-12B.

In general, the present disclosure describes various techniques and devices that enable backplanes with low-power consumption and high operating bandwidth to support high resolution displays (e.g., light field displays). These techniques and devices can take into account different features including the display application (e.g., tablet, phone, watch, TV, laptop, monitor, billboard, etc.), the semiconductor technology, the modulation options, and the addressing options.

FIGS. 1A-4B, which are described below, provide a general overview of the types of displays for which the various backplane aspects described in this disclosure may be applicable.

FIG. 1A shows a diagram 100*a* that illustrates an example of a display 110 that receives content/data 125 (e.g., image content, video content, or both) from a source 120. The display 110 may include one or more panels (see e.g., FIG.

1B), where each panel in the display 110 is a light emitting panel or a reflective panel. The panel may include not only light emitting or light reflecting elements in some arrangement or array, but may also include a backplane for driving the light emitting or light reflecting elements. When light emitting panels are used they can include multiple light emitting elements (see e.g., light emitting elements 220 in FIG. 2A). These light emitting elements can be light-emitting diodes (LEDs) made from one or more semiconductor materials. The LEDs can be an inorganic LEDs. The LEDs can be, for example, micro-LEDs, also referred to as microLEDs, mLEDs, or μLEDs. Other display technologies from which the light emitting elements can be made include liquid crystal display (LCD) technology or organic LED (OLED) technology. The terms "light emitting element," "light emitter," or simply "emitter," may be used interchangeably in this disclosure.

The display 110 can have capabilities that include ultra-high-resolution capabilities (e.g., support for resolutions of 8K and higher), high dynamic range (contrast) capabilities, or light field capabilities, or a combination of these capabilities. When the display 110 has light field capabilities and can operate as a light field display, the display 110 can include multiple picture elements (e.g., super-raxels), where each picture element has a respective light steering optical element and an array of light emitting elements (e.g., sub-raxels) monolithically integrated on a same semiconductor substrate, and where the light emitting elements in the array are arranged into separate groups (e.g., raxels) to provide multiple views supported by the light field display (see e.g., FIGS. 2A-3).

Figure 1B:
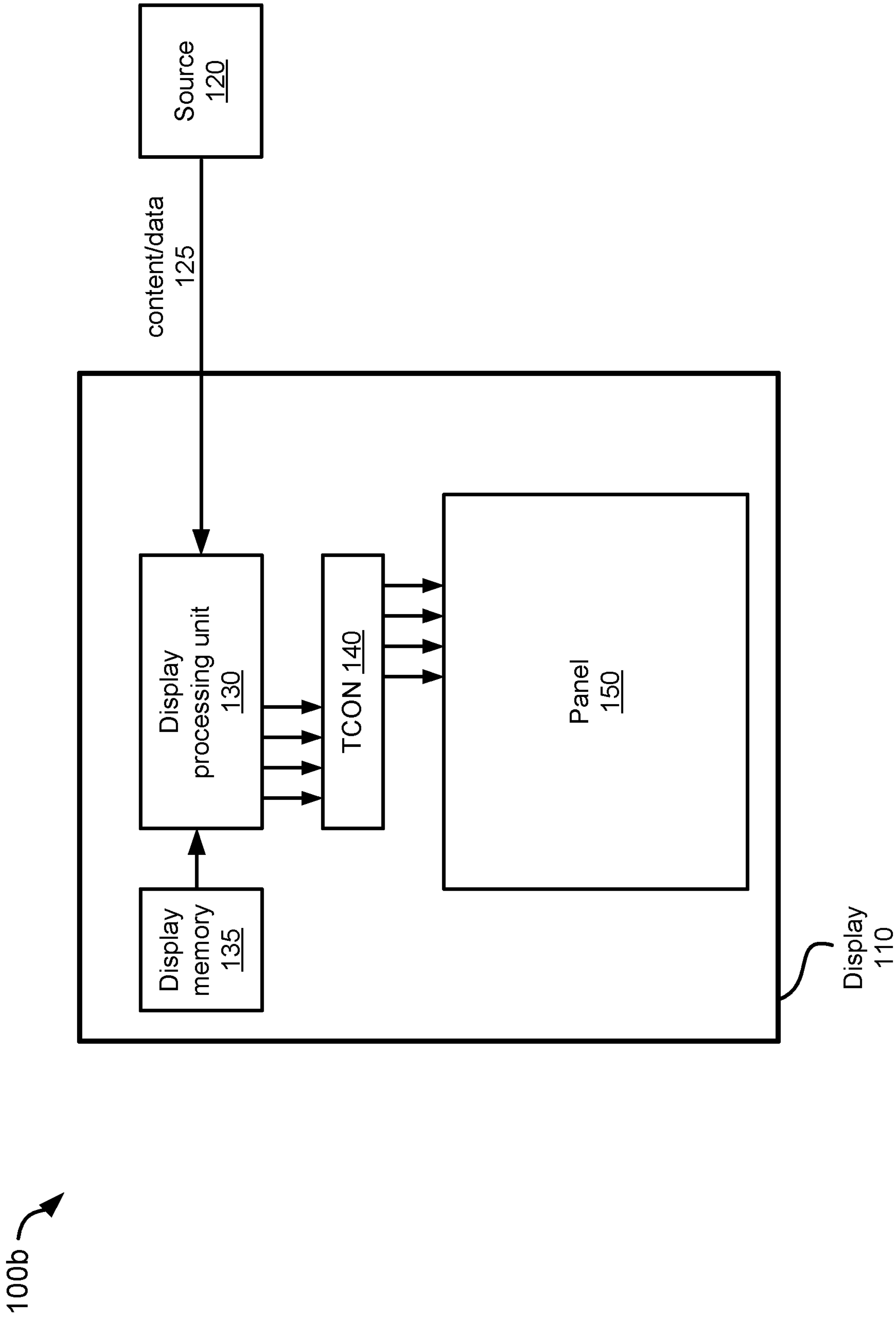
FIG. 1B illustrates an example of a display processing unit in a display, in accordance with aspects of this disclosure.

A diagram 100*b* is shown in FIG. 1B to illustrate additional details of the display 110 in FIG. 1A. In this example, the source 120 provides content/data 125 to a display processing unit 130 integrated within the display 110. The terms "display processing unit" and "processing unit" may be used interchangeably in this disclosure. In addition to the functionality described above for a display source, the source 120 can be configured to stream red-green-blue and depth (RGBD) data from movies or special cameras, and may also render RGBD data from computer generated content. The source 120 may provide the content/data 125 though HDMI/DP, for example, and the content/data 125 can be 10 bit high dynamic range (HDR) data or RGBD data.

The display processing unit 130 is configured to that modify an image or video content in the content/data 125 for presentation by the display 110. A display memory 135 is also shown that stores information used by the display processing unit 130 for handing the image or video content. The display memory 135, or a portion of it, can be integrated with the display processing unit 130. The set of tasks that can be performed by the display processing unit 130 may include tasks associated with color management, data conversion, and/or multiview processing operations. The display processing unit 130 may provide processed content/data to a timer controller (TCON) 140, which in turn provides the appropriate display information to a panel 150. At mentioned above, the panel 150 (also referred to as a display panel) can include a backplane for driving light emitting or light reflecting elements in the panel 150. As illustrated in the diagram 100*b*, there may be multiple low voltage differential signaling (LVDS) and/or MIPI interfaces used to transfer processed content/data from the display processing unit 130 to the TCON 140. Similarly, the information or signaling from the TCON 140 to the panel 150 can be parallelized.

Figure 2A:
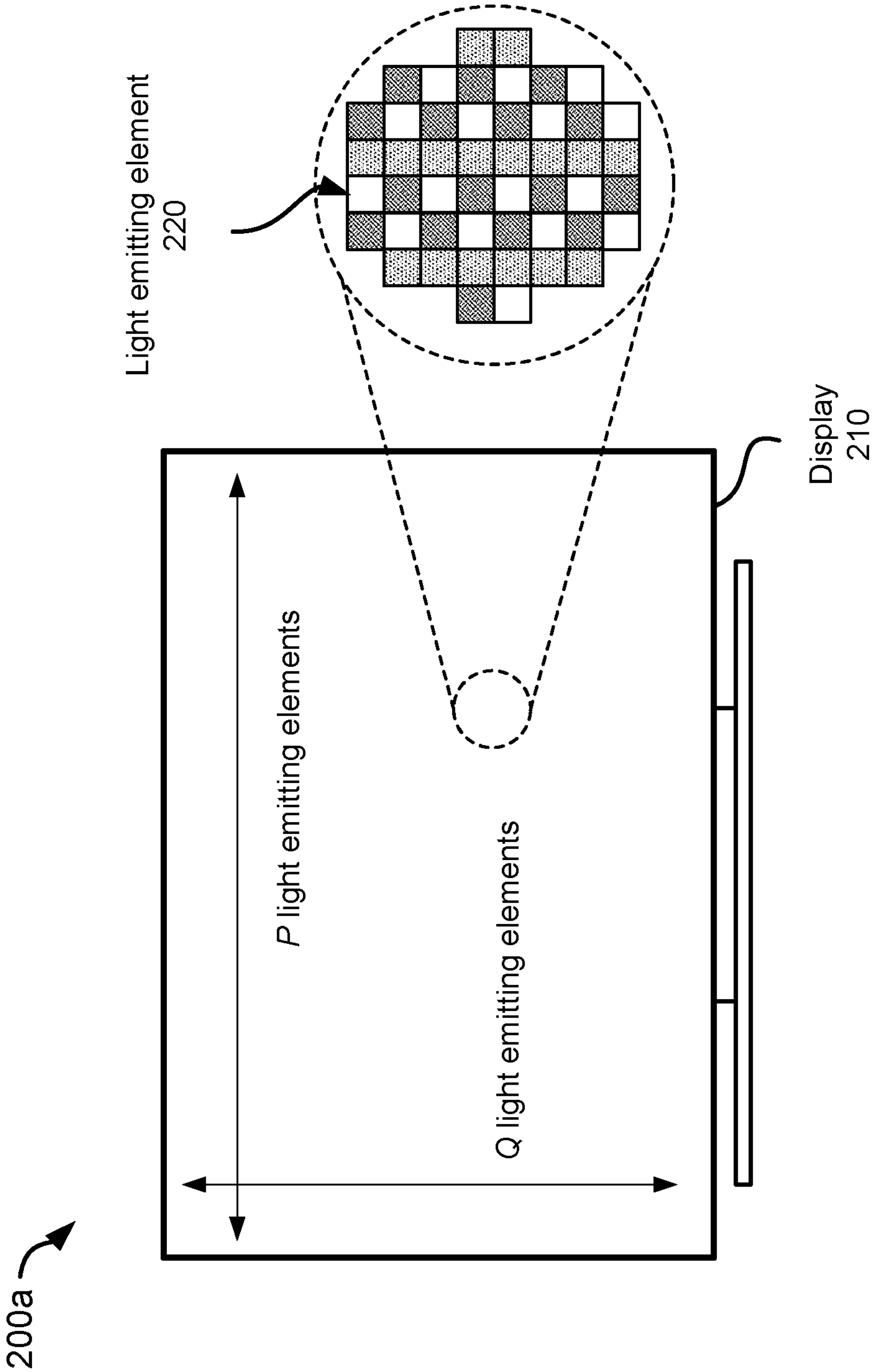
FIG. 2A illustrates an example of a display having multiple pixels, in accordance with aspects of this disclosure.

A diagram 200*a* in FIG. 2A shows a display 210 having multiple light emitting elements 220, typically referred to as pixels or display pixels. The light emitting elements 220 are generally formed in an array and adjacent to each other to provide for a higher resolution of the display 210. The display 210*a* may be an example of the display 110 in the diagrams 100*a* and 100*b*.

In the example shown in FIG. 2A, the light emitting elements 220 can be organized or positioned into an Q×P array, with Q being the number of rows of pixels in the array and Q being the number of columns of pixels in the array. An enlarged portion of such an array is shown to the right of the display 210. For small displays, examples of array sizes can include Q≥10 and P≥10 and Q≥100 and P≥100. For larger displays, examples of array sizes can include Q≥500 and P≥500, Q≥1,000 and P≥1,000, Q≥5,000 and P≥5,000, Q≥10,000 and P≥10,000, with even larger array sizes also possible.

Although not shown, the display 210 may include, in addition to the array of light emitting elements 220, a backplane for driving the array. The backplane used with the display 210 may be based on the features described herein that enable backplanes with low power consumption and high bandwidth operation.

Figure 2B:
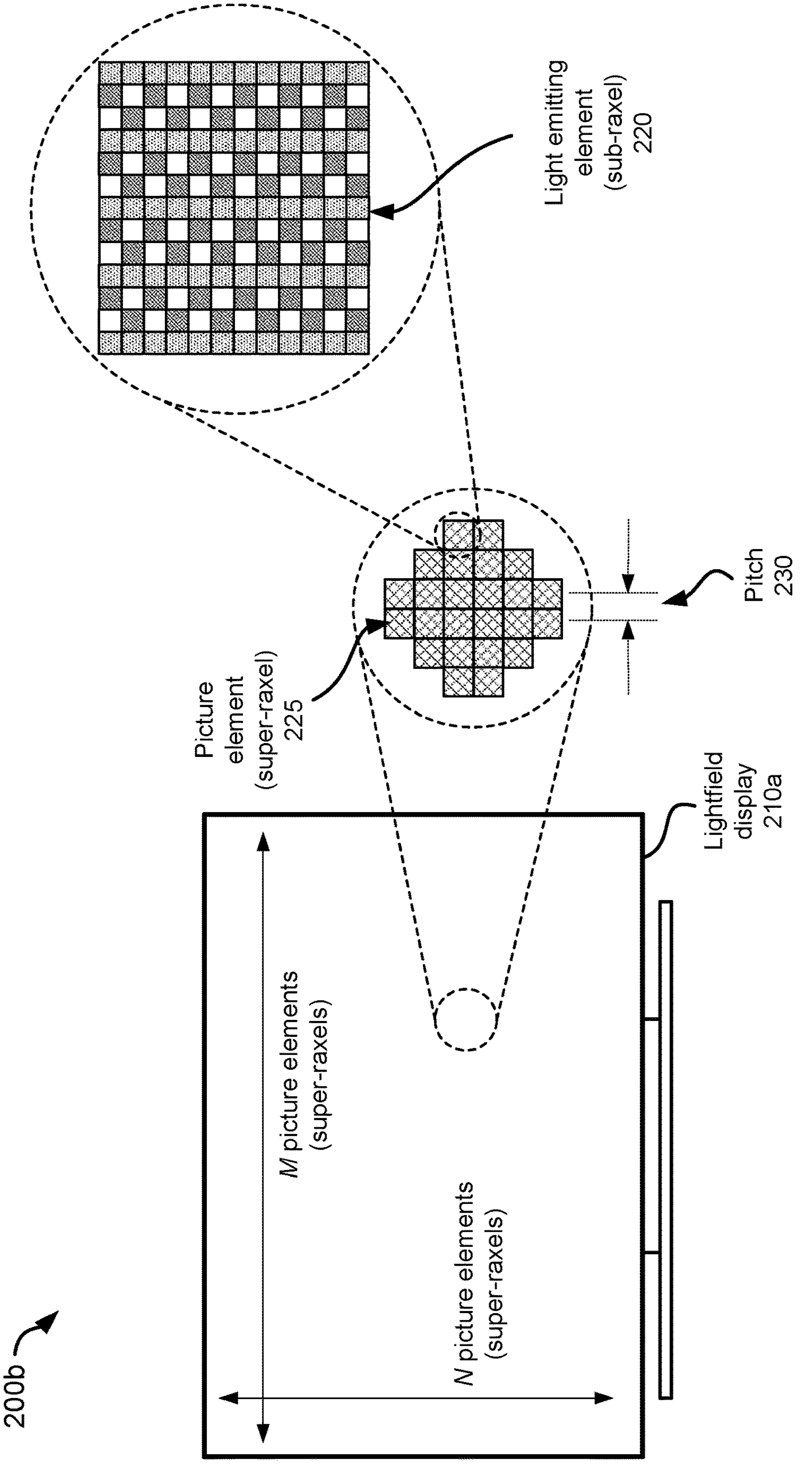
FIGS. 2B and 2C illustrate examples of a light field display having multiple picture elements, in accordance with aspects of this disclosure.

A diagram 200*b* in FIG. 2B shows a light field display 210*a* having multiple picture elements or super-raxels 225. In this disclosure, the term "picture element" and the term "super-raxel" can be used interchangeably to describe a similar structural unit in a light field display. The light field display 210*a* may be an example of the display 110 in the diagrams 100*a* and 100*b* having light field capabilities. The light field display 210*a* can be used for different types of applications and its size may vary accordingly. For example, a light field display 210*a* can have different sizes when used as displays for watches, near-eye applications, phones, tablets, laptops, monitors, televisions, and billboards, to name a few. Accordingly, and depending on the application, the picture elements 225 in the light field display 210*a* can be organized into arrays, grids, or other types of ordered arrangements of different sizes. The picture elements 225 of the light field display 210*a* can be distributed over one or more display panels.

In the example shown in FIG. 2B, the picture elements 225 can be organized or positioned into an N×M array, with N being the number of rows of picture elements in the array and M being the number of columns of picture elements in the array. An enlarged portion of such an array is shown to the right of the light field display 210*a*. For small displays, examples of array sizes can include N≥10 and M≥10 and N≥100 and M≥100, with each picture element 225 in the array having itself an array or grid of light emitting elements 220 or sub-raxels (as shown further to the right). For larger displays, examples of array sizes can include N≥500 and M≥500, N≥1,000 and M≥1,000, N≥5,000 and M≥5,000 and N≥10,000 and M≥10,000, with each picture element 225 in the array having itself an array or grid of light emitting elements 220.

When the picture elements or super-raxels 225 include as light emitting elements 220 different LEDs on a same semiconductor substrate that produce red (R) light, green (G) light, and blue (B) light, the light field display 210*a* can be said to be made from monolithically integrated RGB LED super-raxels.

Each of the picture elements 225 in the light field display 210*a*, including its corresponding light steering optical element 215 (an integral imaging lens illustrated in a diagram 200*c* in FIG. 2C), can represent a minimum picture element size limited by display resolution. In this regard, an array or grid of light emitting elements 220 of a picture element 225 can be smaller than the corresponding light steering optical element 215 for that picture element. In practice, however, it is possible for the size of the array or grid of light emitting elements 220 of a picture element 225 to be similar to the size of the corresponding light steering optical element 215 (e.g., the diameter of a microlens or lenslet), which in turn can be similar or the same as a pitch 230 between picture elements 225.

As mentioned above, an enlarged version of an array of light emitting elements 220 for a picture element 225 is shown to the right of the diagram 200*b*. The array of light emitting elements 220 can be an X×Y array, with X being the number of rows of light emitting elements 220 in the array and Y being the number of columns of light emitting elements 220 in the array. Examples of array sizes can include X≥5 and Y≥5, X≥8 and Y≥8, X≥9 and Y≥9, X≥10 and Y≥10, X≥12 and Y≥12, X≥20 and Y≥20, and X≥25 and Y≥25. In an example, a X×Y array is a 9×9 array including 81 light emitting elements or sub-raxels 220.

For each picture element 225, the light emitting elements 220 in the array can include separate and distinct groups of light emitting elements 220 (see e.g., group of light emitting elements 260 in FIG. 2D) that are allocated or grouped (e.g., logically grouped) based on spatial and angular proximity and that are configured to produce the different light outputs (e.g., directional light outputs) that contribute to produce light field views provided by the light field display 210*a* to a viewer. The grouping of sub-raxels or light emitting elements into raxels need not be unique. For example, during assembly or manufacturing, there can be a mapping of sub-raxels into particular raxels that best optimize the display experience. A similar re-mapping can be performed by the display once deployed to account for, for example, aging of various parts or elements of the display, including variations in the aging of light emitting elements of different colors and/or in the aging of light steering optical elements. In this disclosure, the term "groups of light emitting elements" and the term "raxel" can be used interchangeably to describe a similar structural unit in a light field display. The light field views produced by the contribution of the various groups of light emitting elements or raxels can be perceived by a viewer as continuous or non-continuous views.

Each of the groups of light emitting elements 220 in the array of light emitting elements 220 includes light emitting elements that produce at least three different colors of light (e.g., red light, green light, blue light, and perhaps also white light). In one example, each of these groups or raxels includes at least one light emitting element 220 that produces red light, one light emitting element 220 that produces green light, and one light emitting element 220 that produce blue light. Alternatively, at least one light emitting element 220 that produces white light may also be included.

Figure 2C:
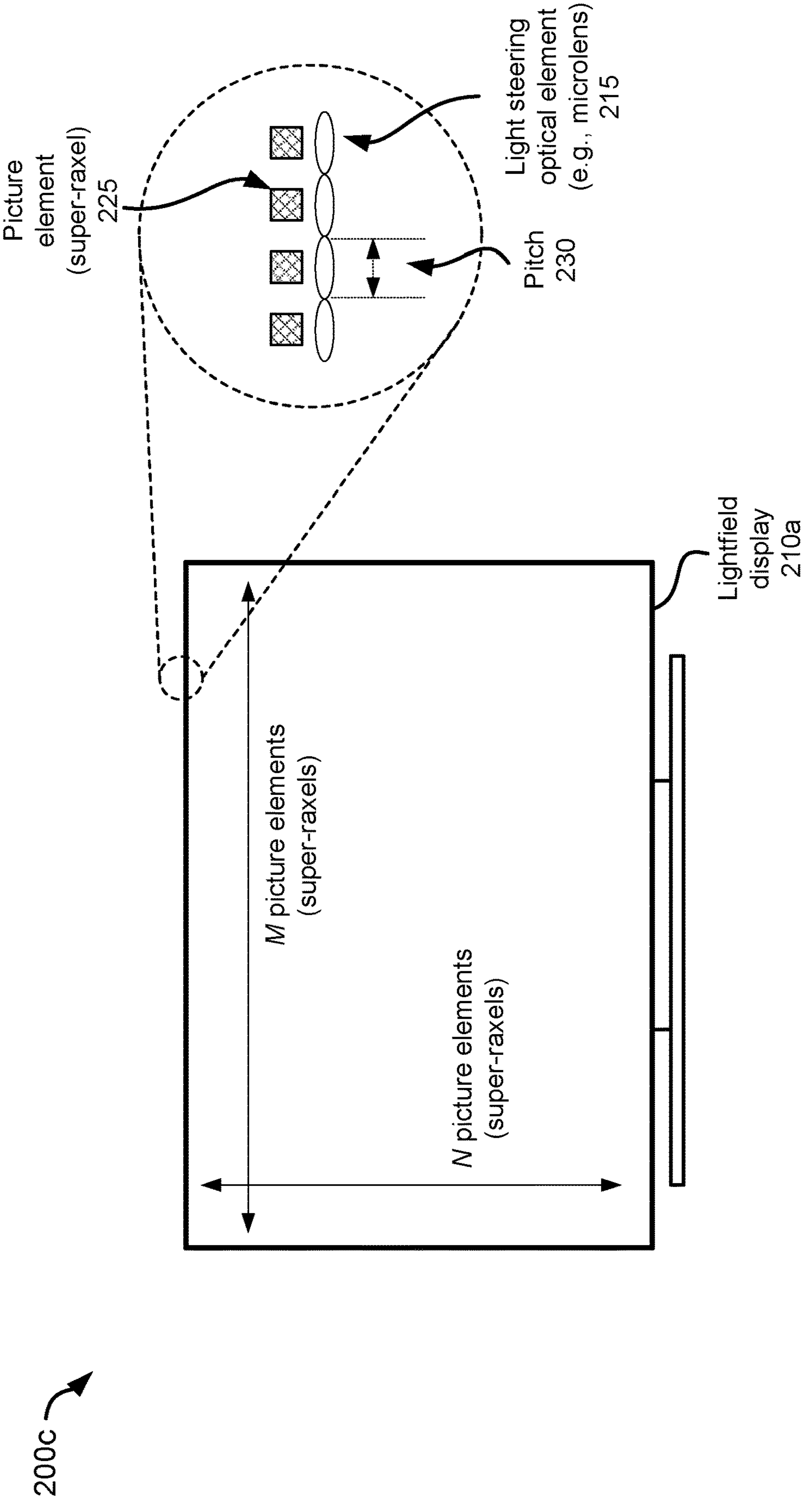

In FIG. 2C, a diagram 200*c* shows another example of the light field display 210*a* illustrating an enlarged view of a portion of an array of picture elements 225 with corresponding light steering optical elements 215 as described above. The pitch 230 can represent a spacing or distance between picture elements 225 and can be about a size of the light steering optical element 215 (e.g., size of a microlens or lenslet). Although the picture elements 225 are shown separate from each other, this is just for better illustration purposes and they are typically built adjacent to each other.

Figure 2D:
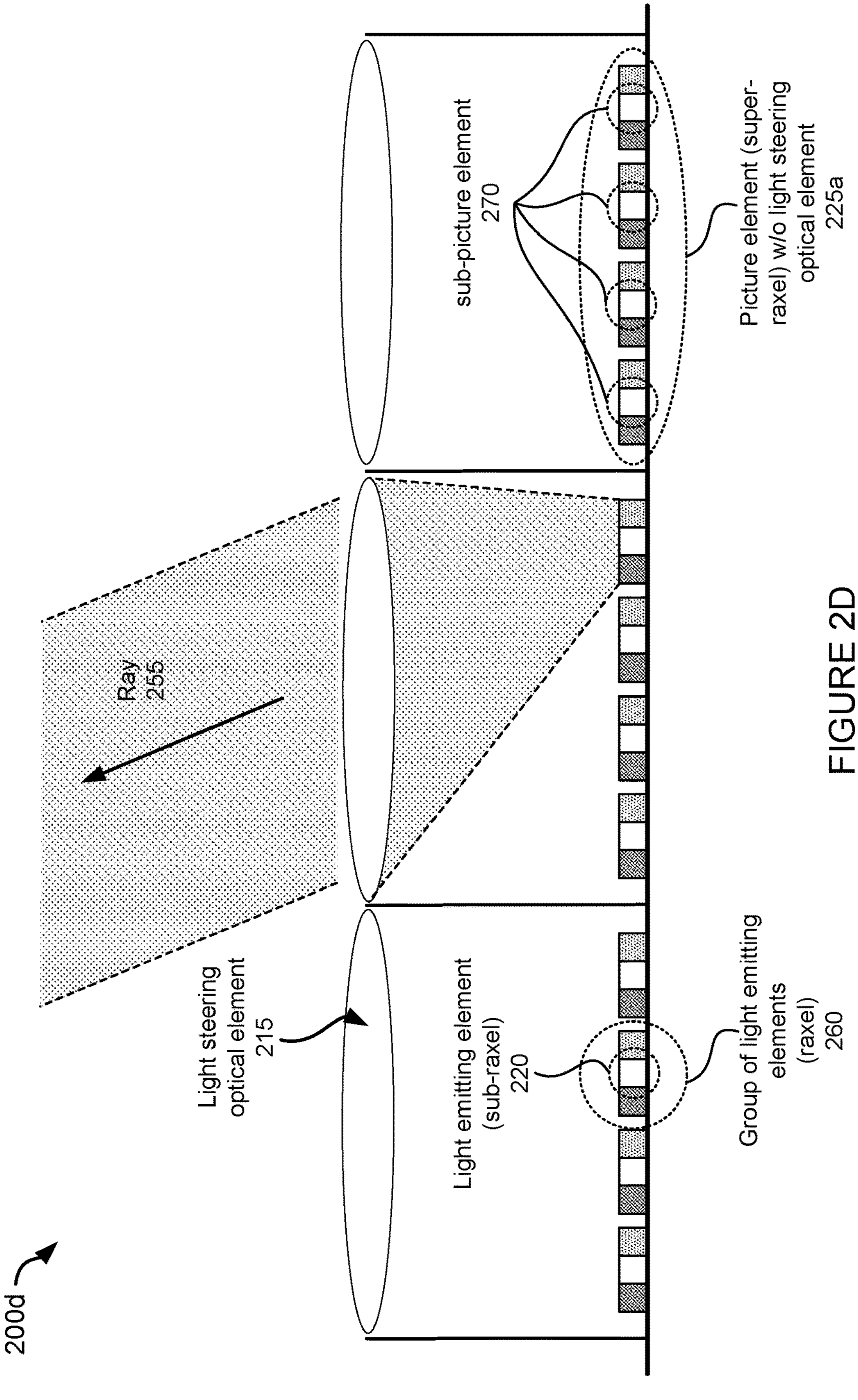
FIG. 2D illustrates an example of a cross-sectional view of a portion of a light field display, in accordance with aspects of this disclosure.

A diagram 200*d* in FIG. 2D shows a cross-sectional view of a portion of a light field display (e.g., the light field display 210*a*) to illustrate some of the structural units described in this disclosure for when the display 110 in FIG. 1A is configured as a light field display. For example, the diagram 200*d* shows three adjacent picture elements or super-raxels 225*a*, each having a corresponding light steering optical element 215. In this example, the light steering optical element 215 can be considered separate from the picture element 220*a* but in other instances the light steering optical element 215 can be considered to be part of the picture element.

As shown in FIG. 2D, each picture element 225*a* includes multiple light emitting elements 220 (e.g., multiple sub-raxels), where several light emitting elements 220 (e.g., several sub-raxels) of different types can be grouped together into the group 260 (e.g., into a raxel). A group or raxel can produce various components that contribute to a particular ray element 255 as shown by the right-most group or raxel in the middle picture element 225*a*. Is it to be understood that the ray elements 255 produced by different groups or raxels in different picture elements can contribute to a view perceived by viewer away from the light field display.

An additional structural unit described in FIG. 2D is the concept of a sub-picture element 270, which represents a grouping of the light emitting elements 220 of the same type (e.g., produce the same color of light) of the picture element 225*a*.

As in other examples described above, some of the elements shown to be separate from each other in the diagram 200*d* in FIG. 2D are merely shown this way for better illustration purposes and they may be typically built adjacent to each other.

Figure 3:
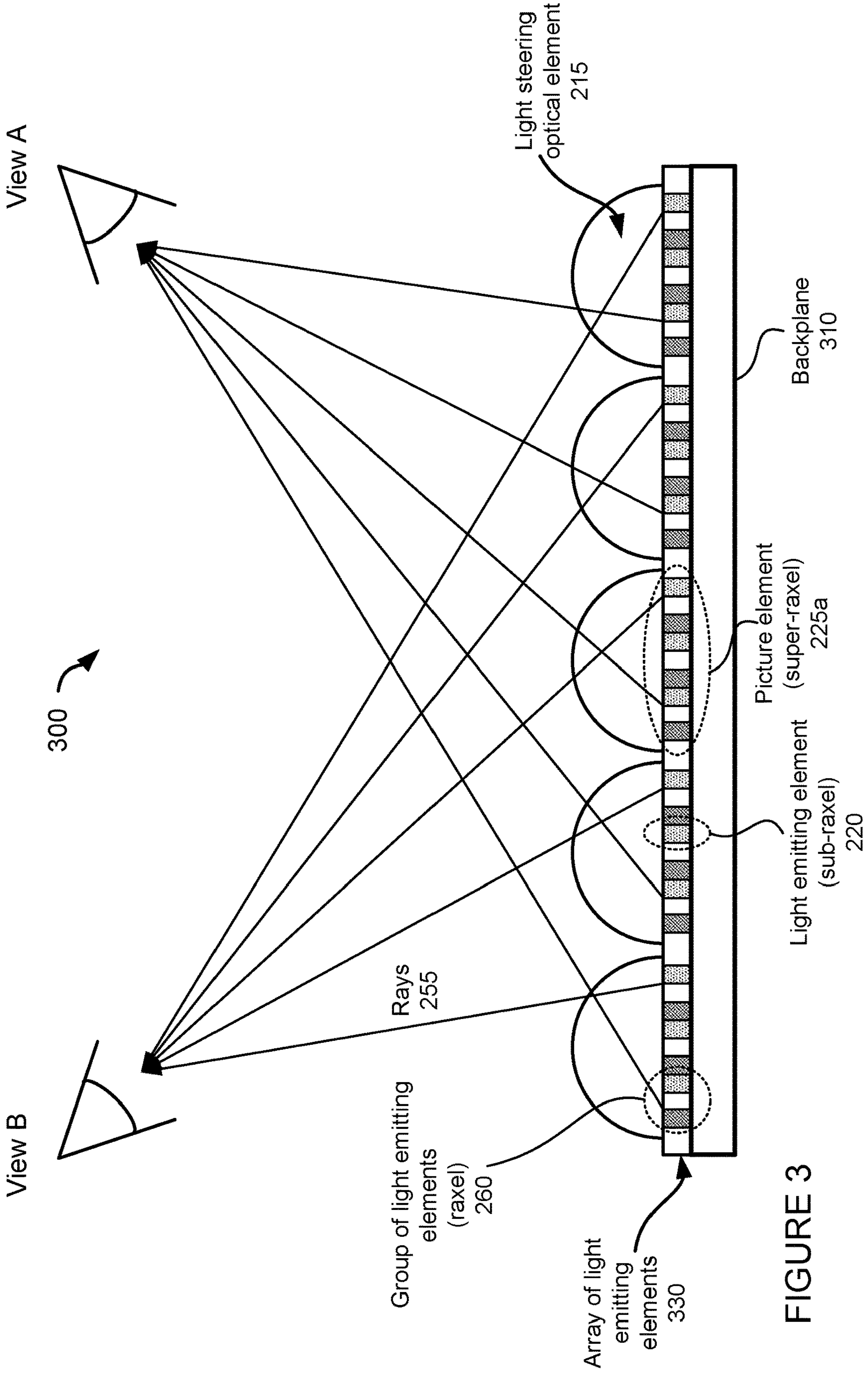
FIG. 3 illustrates an example of a backplane integrated with an array of light emitting elements, in accordance with aspects of this disclosure.

A diagram 300 in FIG. 3 illustrates an example of a backplane integrated with an array of light emitting elements. The diagram 300 shows a cross-sectional view, similar to that in the diagram 200*d* in FIG. 2D. The diagram 300 shows the light emitting optical elements (sub-raxels) 220, the groups of light emitting elements (raxels) 260, the picture elements (super-raxels) 225*a*, and the light steering optical elements 215. Also shown is a representation of how various rays 255 from different picture elements may contribute to produce different views, such as view A and view B. Moreover, the light emitting elements 220 of the picture elements 225*a* form a larger array 330 that is then connected to a backplane 310, which in turn is configured to drive each of the light emitting elements 220.

Figure 4A:
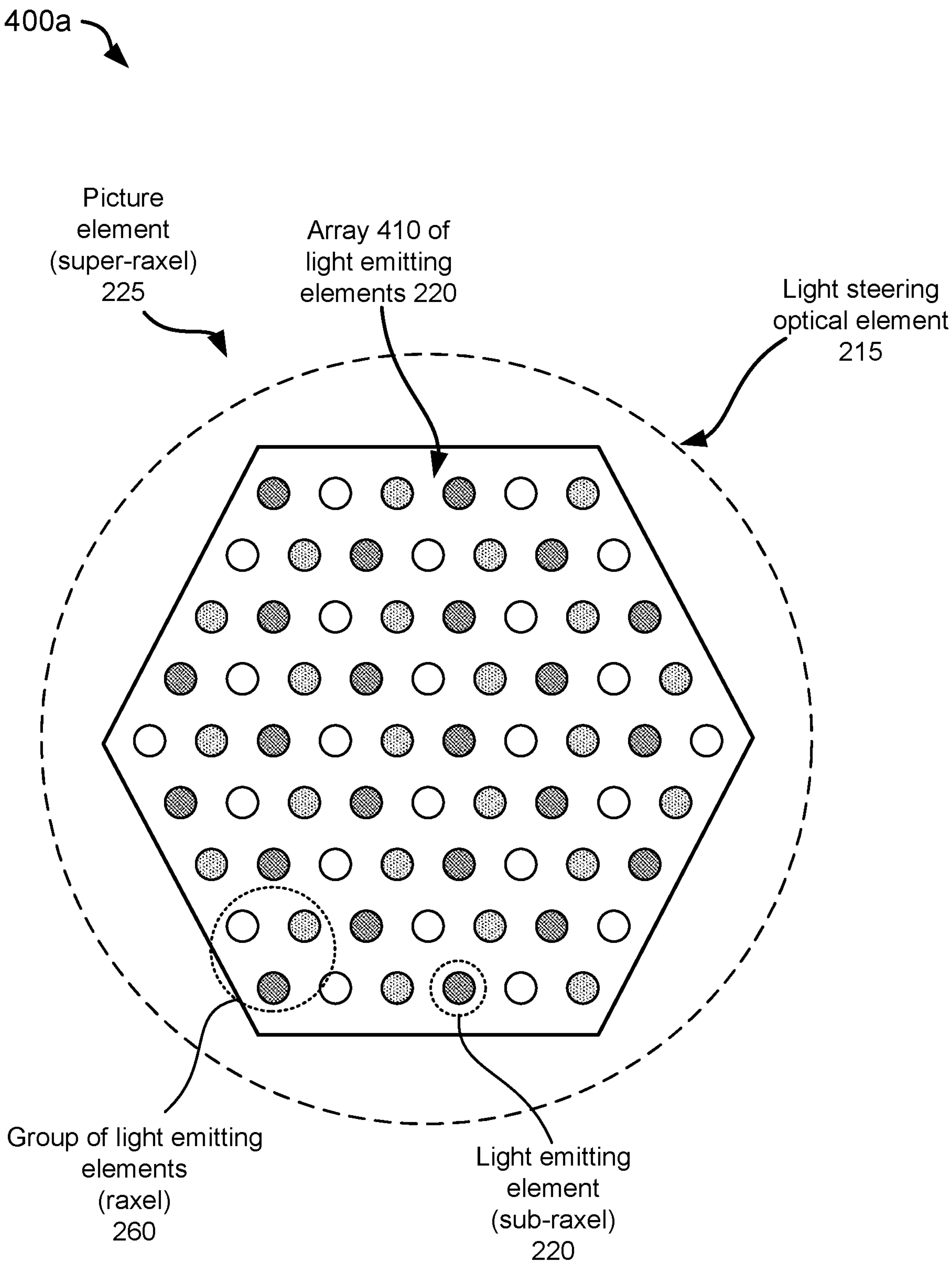
FIG. 4A illustrates an example of an array of light emitting elements in a picture element, in accordance with aspects of this disclosure.

FIG. 4A shows a diagram 400*a* describing various details of one implementation of a picture element 225. For example, the picture element 225 (e.g., a super-raxel) has a respective light steering optical element 215 (shown with a dashed line) and includes an array or grid 410 of light emitting elements 220 (e.g., sub-raxels) monolithically integrated on a same semiconductor substrate. The light steering optical element 215 can be of the same or similar size as the array 410, or could be slightly larger than the array 410 as illustrated. It is to be understood that some of the sizes illustrated in the figures of this disclosure have been exaggerated for purposes of illustration and need not be considered to be an exact representation of actual or relative sizes.

The light emitting elements 220 in the array 410 include different types of light emitting elements to produce light of different colors and are arranged into separate groups 260 (e.g., separate raxels) that provide different contributions to the multiple views produced by a light field display.

As shown in FIG. 4A, the array 410 has a geometric arrangement to allow adjacent or close placement of two or more picture elements. The geometric arrangement can be one of a hexagonal shape (as shown in FIG. 4A), a square shape, or a rectangular shape.

Although not shown, the picture element 225 in FIG. 4A can have corresponding electronic means (e.g., in a backplane) that includes multiple driver circuits configured to drive the light emitting elements 220 in the picture element 225.

Figure 4B:
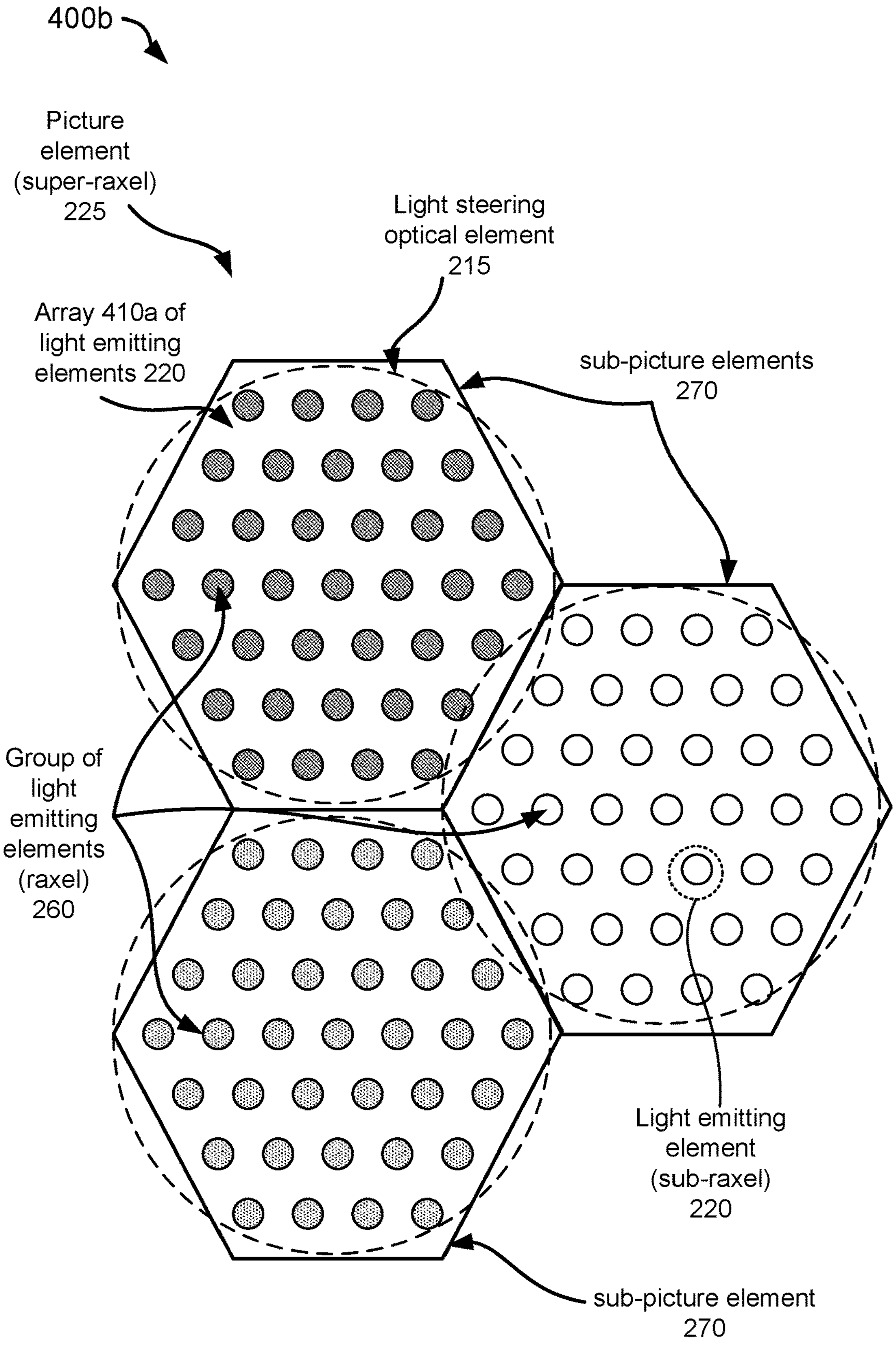
FIG. 4B illustrates an example of a picture element with sub-picture elements, in accordance with aspects of this disclosure.

FIG. 4B shows a diagram 400*b* describing various details of another implementation of a picture element 225. For example, the picture element 225 (e.g., a super-raxel) in FIG. 4B includes multiple sub-picture elements 270 monolithically integrated on a same semiconductor substrate. Each sub-picture element 270 has a respective light steering optical element 215 (shown with a dashed line) and includes an array or grid 410*a* of light emitting elements 220 (e.g., sub-raxels) that produce the same color of light. The light steering optical element 215 can be of the same or similar size as the array 410*a*, or could be slightly larger than the array 410*a* as illustrated. For the picture element 225, the light steering optical element 215 of one of the sub-picture elements 270 is configured to optimize the chromatic dispersion for a color of light produced by the light emitting elements 220 in that sub-picture element 720. Moreover, the light steering optical element 215 can be aligned and bonded to the array 410*a* of the respective sub-picture element 270.

The light emitting elements 220 of the sub-picture elements 720 are arranged into separate groups 260 (e.g., raxels). As illustrated by FIG. 4B, in one example, each group 260 can include collocated light emitting elements 220 from each of the sub-picture elements 270 (e.g., same position in each sub-picture element). As mentioned above, however, the mapping of various light emitting elements 220 to different groups 260 can be varied during manufacturing and/or operation.

As shown in FIG. 4B, the array 410*a* has a geometric arrangement to allow adjacent placement of two or more sub-picture elements. The geometric arrangement can be one of a hexagonal shape (as shown in FIG. 4B), a square shape, or a rectangular shape.

Although not shown, the picture element 225 in FIG. 4B can have corresponding electronic means (e.g., in a backplane) that includes multiple driver circuits configured to drive the light emitting elements 220 in the picture element 225. In some examples, one or more common driver circuits can be used for each of the sub-picture elements 270.

Figure 5:
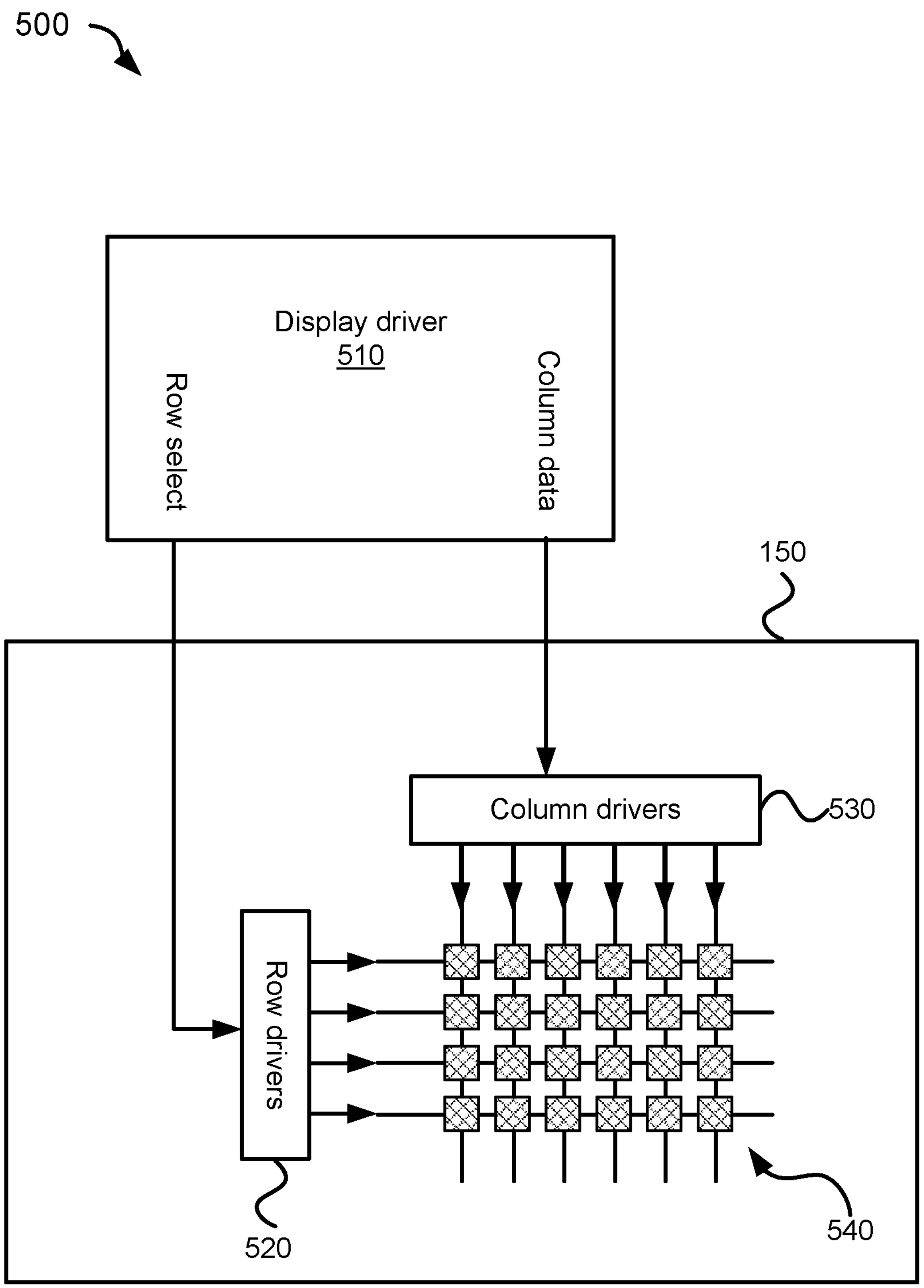
FIG. 5 illustrates an example of a backplane driver, in accordance with aspects of this disclosure.

A diagram 500 in FIG. 5 illustrates an example of a simplified schematic of a backplane driver, such as a display driver 510, that can be used in a display to drive a backplane. The display driver 510 may be configured to generate signals that provide the appropriate information a backplane and an array of pixels in a display panel (e.g., the panel 150) to operate together to reproduce image and/or video content.

The display driver 510 can generate row select signals ("Row select") that are provided to the row drivers 520 to control the selection of row in an array of pixels 540. The display driver can also generate column data ("Column data") that is provided to the column drivers 530, which in turn controls how the data is provided to the array of pixels 540 to be reproduced. In some implementations, the row drivers 520 and the column drivers 530 are considered to be part of the backplane architecture, while in other implementations they may be considered to be separate from the backplane architecture. The array of pixel 540 may include not only the light elements associated with each pixel but also the corresponding backplane transistors and/or circuitry.

Figure 6A:
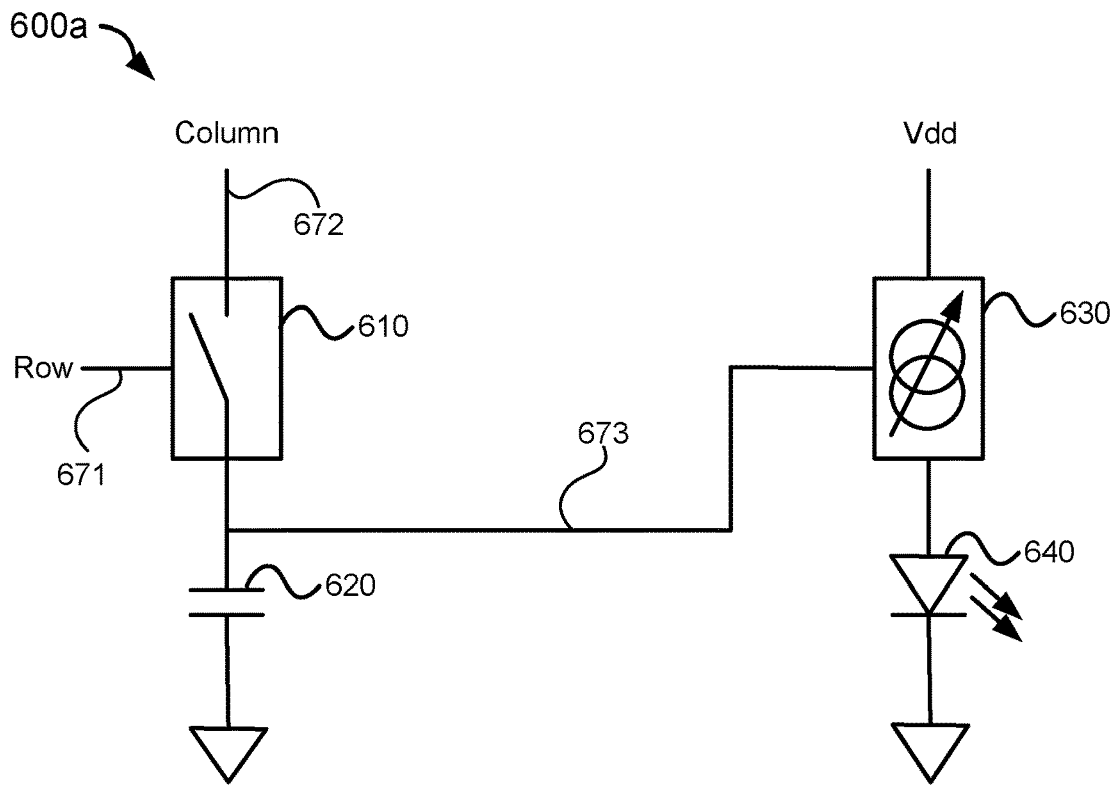
FIGS. 6A and 6B illustrate an example of a backplane unit cell that operates using analog modulation, in accordance with aspects of this disclosure.
Figure 6B:
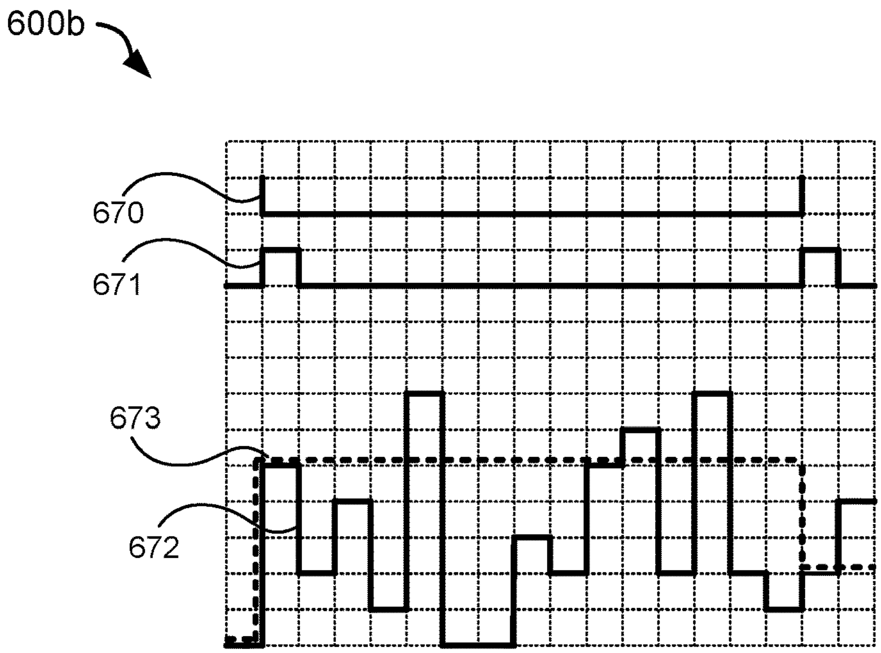

FIGS. 6A and 6B show diagrams 600*a* and 600*b* that illustrate an example of a backplane unit cell that operates using analog modulation (AM). This backplane unit cell configuration is shown in the diagram 600*a* and includes a first switch 610, a storage element 620, and a source 630. A light emitting element 640 is also shown electrically connected to the source 630 but the light emitting element 640 does not form part the backplane architecture as does the backplane unit cell. In one implementation, the first switch 610 and the storage element 620 can be made with two transistors (2T) and a capacitor (C), respectively (also referred to as a 2T1C circuit). Although the source 630 is shown as a current source, the source 630 can be a current source or a voltage source, depending on the light emitting element 640 being used. For example, when the light emitting element 640 is a pixel in liquid crystal display (LCD), the source 630 can be a voltage source. Alternatively, when the light emitting element 640 is an LED, the source 630 can be a current source.

In this backplane unit cell configuration, a row selection signal ("Row") selects a column data value ("Column") and the selected value is stored in the storage element 620. The row selection signal may correspond to the "Row select" and/or the outputs of the row drivers 520 and the column data may correspond to the "Column data" and/or the outputs of the column drivers 530 in the diagram 500 in FIG. 5. The value stored in the storage element 620 is then provided to the source 630 to drive the light emitting element 640. The intensity of the light generated by the light emitting element 640 can be based on the drive signal provided by the source 630, which in turn can be based on the value stored in the storage element 620.

The operation of the backplane unit cell in the diagram 600*a*, which is generally described above, is described in more detail in the timing diagram 600*b*. A signal 670 represents a video frame and a signal 671 represents the row selection of the column data to be stored in the storage element 620. A signal 672 corresponds to the column data, which can vary over time, and a signal 673 (dashed line) is the value that corresponds to the column data value that stored in the storage element 620 at the time of the row selection and remains the same until the next row selection is made.

For this configuration of a backplane unit cell, when the light emitting element 640 is an LED, its bandwidth corresponds to a refresh frequency being used, $f_{refresh}$, and the bandwidth of both the rows and columns corresponds to $f_{refresh} \cdot rows$, where rows is the number of rows. The AM backplane unit cell thus provides a simple circuit, with low bandwidth requirement, and a variable current for an LED as the light emitting element 640.

Figure 7A:
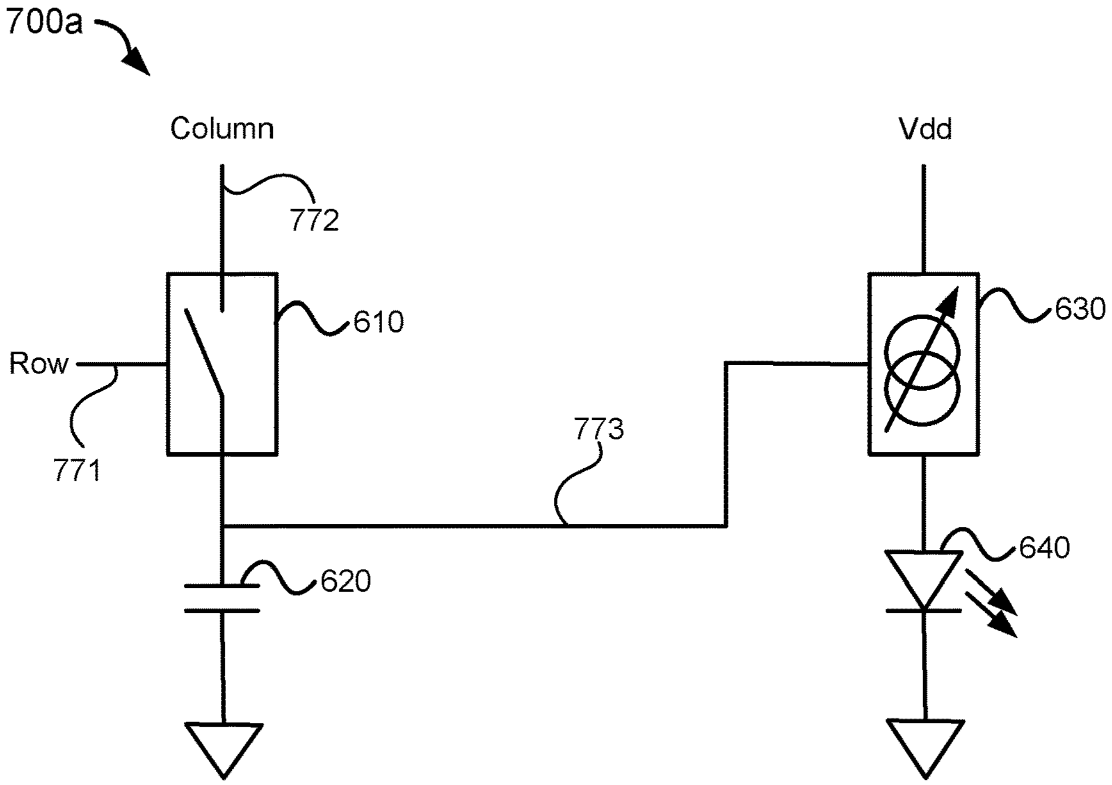
FIGS. 7A and 7B illustrate an example of a backplane unit cell that operates using binary-coded pulse width modulation (B-PWM), in accordance with aspects of this disclosure.
Figure 7B:
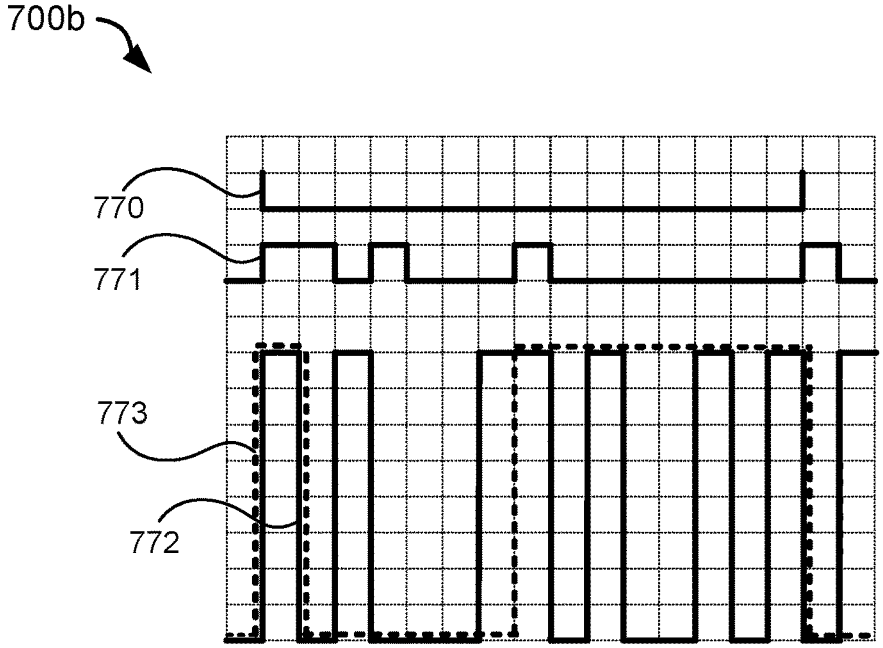

FIGS. 7A and 7B show diagrams 700*a* and 700*b* that illustrate an example of a backplane unit cell that operates using binary-coded pulse width modulation (B-PWM). This backplane unit cell configuration is shown in the diagram 700*a* and includes the first switch 610, the storage element 620, and the source 630, which is a similar configuration as the backplane unit cell configuration described above in connection with the diagrams 600*a* and 60*b* in FIGS. 6A and 6B. The light emitting element 640 electrically connected to the source 630 is also shown. In this example, however the row selection signal ("Row") that selects the column data value ("Column") stored in the storage element 620 is a digital signal that results in a binary-coded pulse width modulation of the value stored in the storage element 620 and provided to the source 630 to drive the light emitting element 640.

The operation of the backplane unit cell in the diagram 700*a*, which is generally described above, is described in more detail in the timing diagram 700*b*. A signal 770 represents a video frame and a signal 771 represents the row selection of the column data to be stored in the storage element 620, where the signal 771 is a binary-coded signal to produce the binary-coded pulse width modulation. In this example, the binary-coded signal is binary code for 1001. A signal 772 corresponds to the column data, which can vary over time, and a signal 773 (dashed line) is the value stored in the storage element 620 at the time of the row selection and remains the same until the next row selection is made.

For this configuration of a backplane unit cell, when the light emitting element 640 is an LED, its bandwidth and that of the rows and columns corresponds to $f_{refresh}\cdot rows\cdot 2^n$, where n is the number of bits in the binary coding. The B-PWM backplane unit cell thus provides a simple circuit, with high bandwidth requirements, and a fixed current for an LED as the light emitting element 640.

Figure 8A:
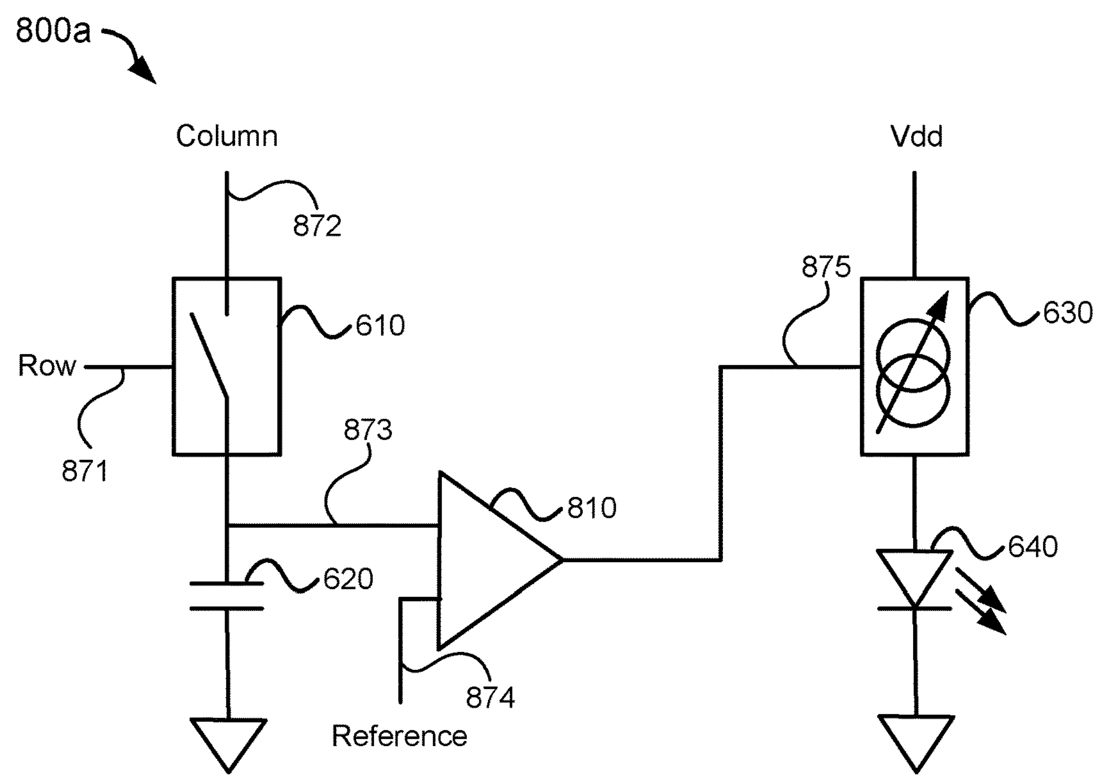
FIGS. 8A and 8B illustrate an example of a backplane unit cell that operates using single pulse width modulation (S-PWM), in accordance with aspects of this disclosure.
Figure 8B:
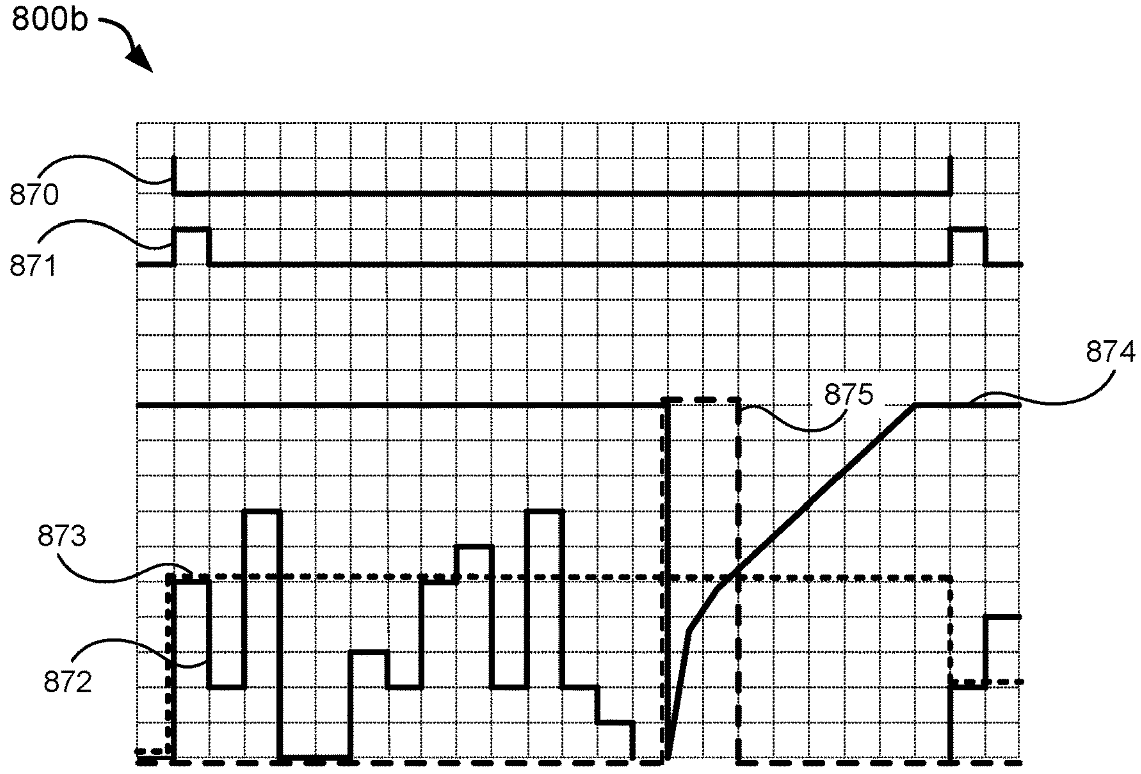

FIGS. 8A and 8B show diagrams 800*a* and 800*b* that illustrate an example of a backplane unit cell that operates using single pulse width modulation (S-PWM). This backplane unit cell configuration is shown in the diagram 800*a* and includes the first switch 610, the storage element 620, the source 630, and a comparator 810. The light emitting element 640 electrically connected to the source 630 is also shown.

In this backplane unit cell configuration, the row selection signal ("Row") selects the column data value ("Column") and the selected value is stored in the storage element 620. The value stored in the storage element 620 is then provided to comparator 810 to be compared to a reference signal ("Reference") and the output of the comparator 810 is then provided to the source 630 to drive the light emitting element 640. The reference signal, also referred to as a reference ramp, is a non-linear signal that may be used to incorporate gamma correction into this backplane unit cell configuration.

The operation of the backplane unit cell in the diagram 800*a*, which is generally described above, is described in more detail in the timing diagram 800*b*. A signal 870 represents a video frame and a signal 871 represents the row selection of the column data to be stored in the storage element 620. A signal 872 corresponds to the column data, which can vary over time, and a signal 873 (short-dashed line) is the value stored in the storage element 620 at the time of the row selection and remains the same until the next row selection is made.

A signal 874 corresponds to the reference signal ("Reference") that is provided to the comparator 810 and a signal 875 (long-dashed line) corresponds to the output of the comparator 810. The signal 874 goes low and then back up again after the signal 872 has completed providing all the column data for the current video frame. In some implementations, the signal 874 may be low and then go up after the signal 872 has completed providing all the column data for the current video frame. The comparator 810 compares the signals 873 and 874 such that when the value of the signal 873, the column data value, is greater than the value of the signal 874, the reference signal value, the signal 875 is high and the source 630 drives the light emitting element 640. On the other hand, when the value of the signal 873 is smaller than the value of the signal 874, the signal 875 is low and the source 630 does not drive the light emitting element 640.

For this configuration of a backplane unit cell, when the light emitting element 640 is an LED, its bandwidth corresponds to $f_{refresh}\cdot 2^n$, and the bandwidth of both the rows and columns corresponds to $f_{refresh}\cdot rows$. The S-PWM backplane unit cell thus needs a more complex circuit, with high bandwidth requirements, a fixed current for an LED as the light emitting element 640, and a smooth grayscale (e.g., gamma correction provided by the reference signal).

Figure 9A:
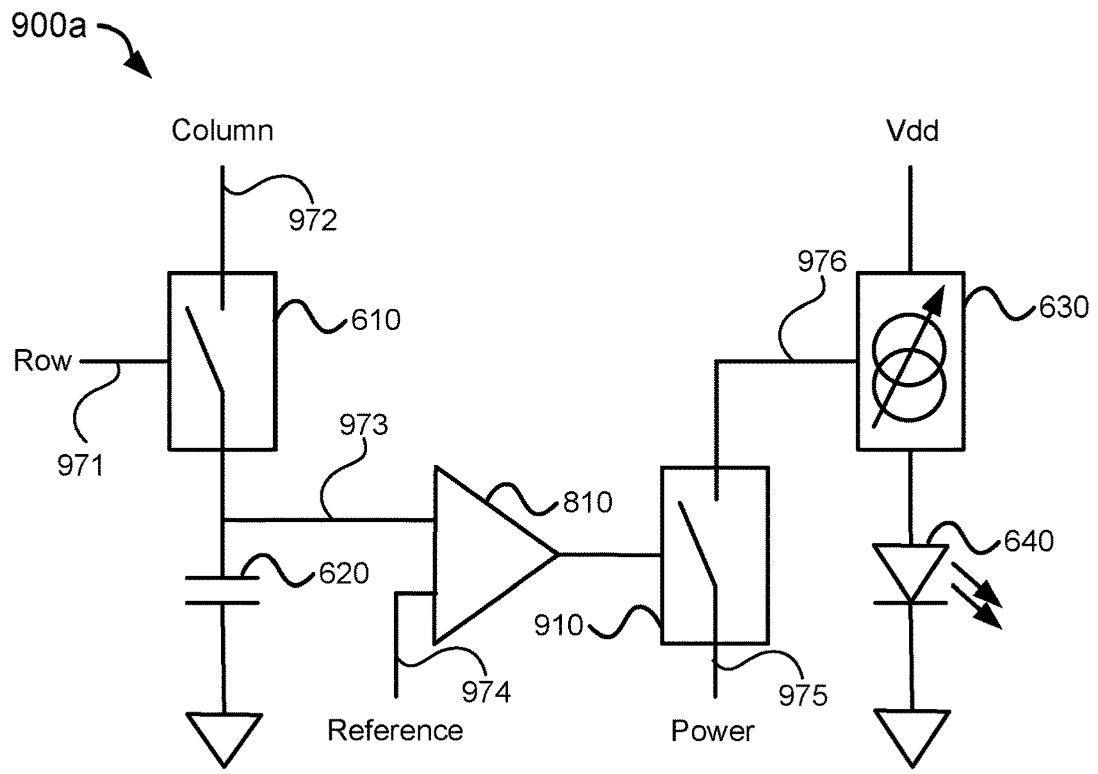
FIGS. 9A-9C illustrate an example of a backplane unit cell that operates using high dynamic range (HDR) pulse width modulation (HDR-PWM or H-PWM), in accordance with aspects of this disclosure.
Figure 9B:
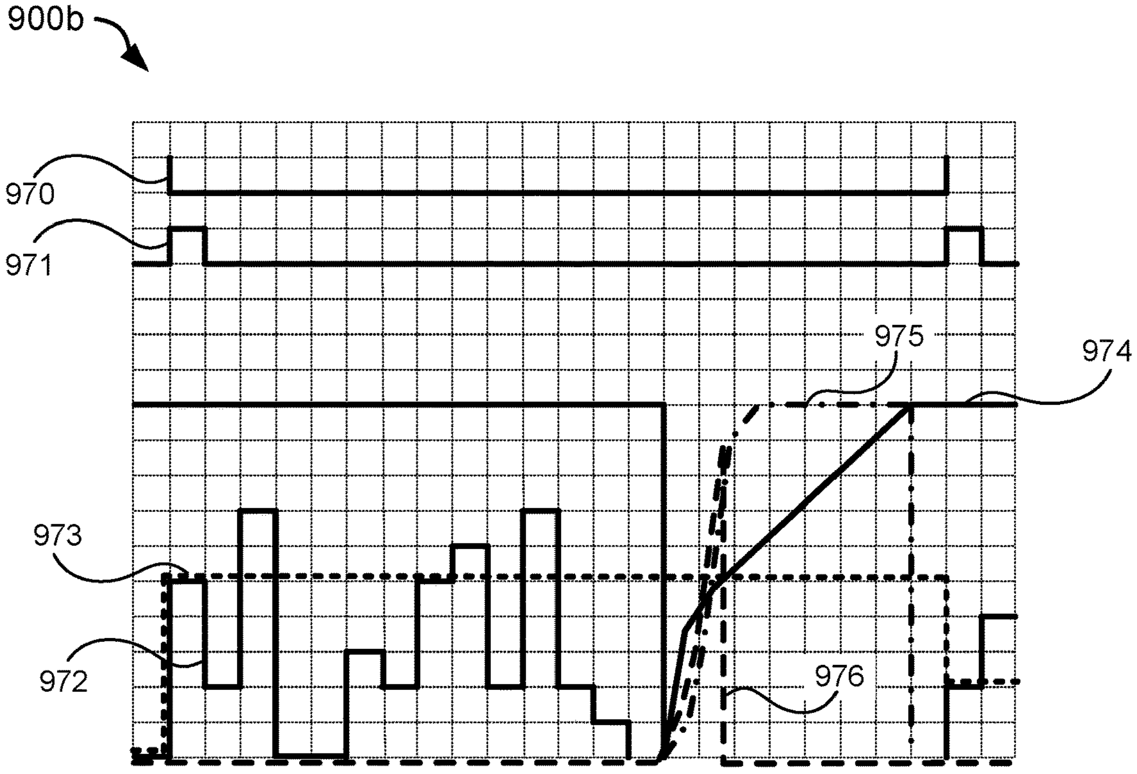
Figure 9C:
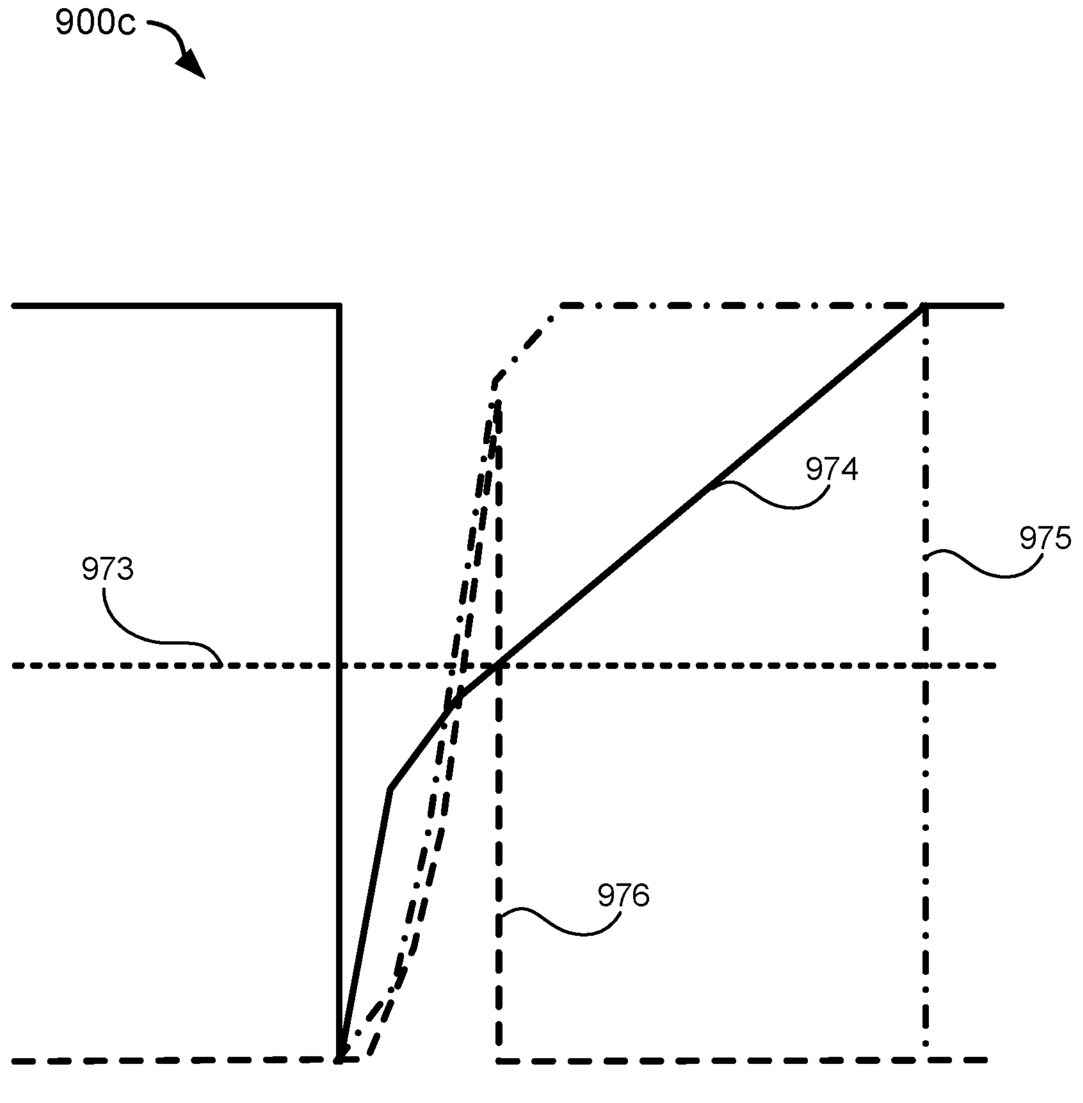

FIGS. 9A-9C show diagrams 900*a*, 900*b*, and 900*c* that illustrate an example of a backplane unit cell that operates using high dynamic range (HDR) pulse width modulation (H-PWM). This backplane unit cell configuration is shown in the diagram 900*a* and includes the first switch 610, the storage element 620, the source 630, the comparator 810, and a second switch 910. The light emitting element 640 is also shown.

In this backplane unit cell configuration, the row selection signal ("Row") selects the column data value ("Column") and the selected value is stored in the storage element 620. The value stored in the storage element 620 is then provided to comparator 810 to be compared to a reference signal ("Reference") and the output of the comparator 810 is then provided to the second switch 910. The second switch 910 can be used to select a power signal ("Power") that is provided to the source 630 to drive the light emitting element 640. The reference signal, also referred to as a reference ramp, is a non-linear signal that may be used to incorporate gamma correction into this backplane unit cell configuration. The power signal, also referred to as a power ramp, is a non-linear signal that may be used to enable high dynamic range at a same bandwidth. The reference signal may be a sub-linear signal, and the power signal may be a super-linear signal.

The operation of the backplane unit cell in the diagram 900*a*, which is generally described above, is described in more detail in the timing diagram 900*b*. A signal 970 represents a video frame and a signal 971 represents the row selection of the column data to be stored in the storage element 620. A signal 972 corresponds to the column data, which can vary over time, and a signal 973 (short-dashed line) is the value stored in the storage element 620 at the time of the row selection and remains the same until the next row selection is made.

A signal 974 corresponds to the reference signal ("Reference") that is provided to the comparator 810, a signal 975 (dashed-dotted line) corresponds to the power signal ("Power"), and a signal 976 (long-dashed line) corresponds to the output of the comparator 810. The comparator 810 compares the signals 973 and 974 such that when the value of the signal 973, the column data value, is greater than the value of the signal 974, the reference signal value, the output of the comparator 810 is high and the power signal (signal 975) is selected as input to the source 630 for driving the light emitting element 640. As illustrated, when the output of the comparator is high, the signal 976 follows the signal 975. On the other hand, when the value of the signal 973 is smaller than the value of the signal 974, the output of the comparator 810 is low and the source 630 does not drive the light emitting element 640. As illustrated, when the output of the comparator 810 is low, so is the signal 976.

The diagram 900*c* shows an expanded view of the signals 973, 974, 975, and 976 in the diagram 900*b* in FIG. 9B to illustrate the operation more clearly. When the signal 973 (e.g., the stored value in the storage element 620) is smaller than the signal 974 (e.g., the reference signal), the output of the comparator 810 is high and the signal 976 to use for the source 630 to drive the light emitting element 640 follows the signal 975 (e.g., the power signal), which is selected using the second switch 910. When the signal 974 is greater than the signal 973, the output of the comparator 810 is low and so is the signal 976, which no longer follows the signal 975.

For this configuration of a backplane unit cell, when the light emitting element 640 is an LED, its bandwidth corresponds to $f_{refresh} \cdot 2^n$, and the bandwidth of both the rows and columns corresponds to $f_{refresh} \cdot$rows. The H-PWM backplane unit cell thus needs a more complex circuit, with lower bandwidth requirements, a reduced current for an LED as the light emitting element 640 at low intensity. Also, gamma correction and high dynamic range can be achieved using this configuration.

FIGS. 6A-9C described above show different modulation options that can be used in connection with backplane unit cells in a backplane. As described, one possible modulation option is analog modulation (AM), which has simple circuit complexity, low bandwidth requirement, variable current for driving an LED, a smooth grayscale gradient, and no flicker (see e.g., FIGS. 6A and 6B). Another possible modulation include digital modulations, such as B-PWM, which also has simple circuit complexity, a high bandwidth requirement, a fixed current for driving an LED, potential contouring in a grayscale gradient, and potential flicker (see e.g., FIGS. 7A and 7B). Yet another possible digital modulation option is S-PWM, which has complex circuitry, a high bandwidth requirement, fixed current for driving an LED, a smooth grayscale gradient, and potential flicker (see e.g., FIGS. 8A and 8B). In addition, the present disclosure proposes yet another possible modulation option, which is described as a HDR-PWM or H-PWM. This newly proposed modulation option has the most complex circuitry, lower bandwidth requirements than B-PWM or S-PWM, reduced current for driving an LED at low light, a smooth grayscale gradient, and potential flicker, making it suitable for displays that require high bandwidths and low power consumption.

Figure 10A:
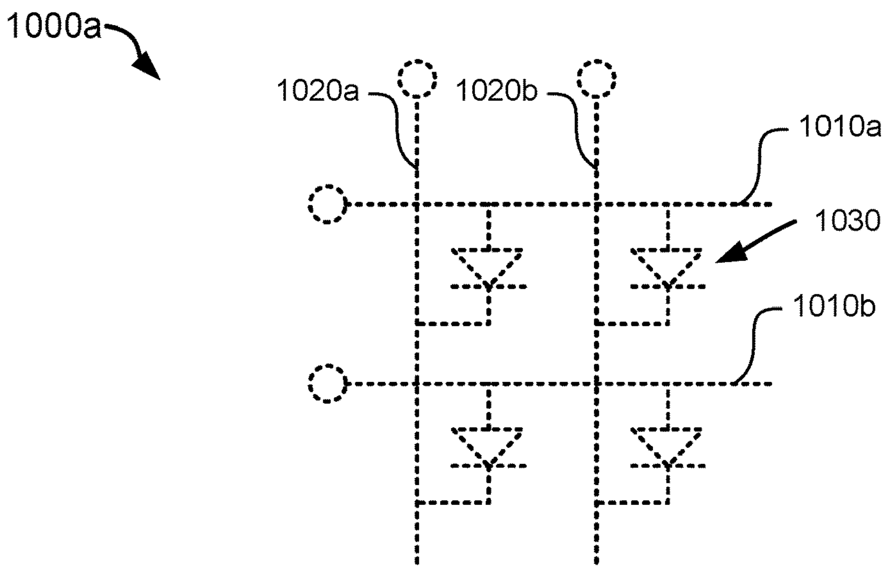
FIGS. 10A-10C illustrates various examples of backplane addressing, in accordance with aspects of this disclosure.
Figure 10B:
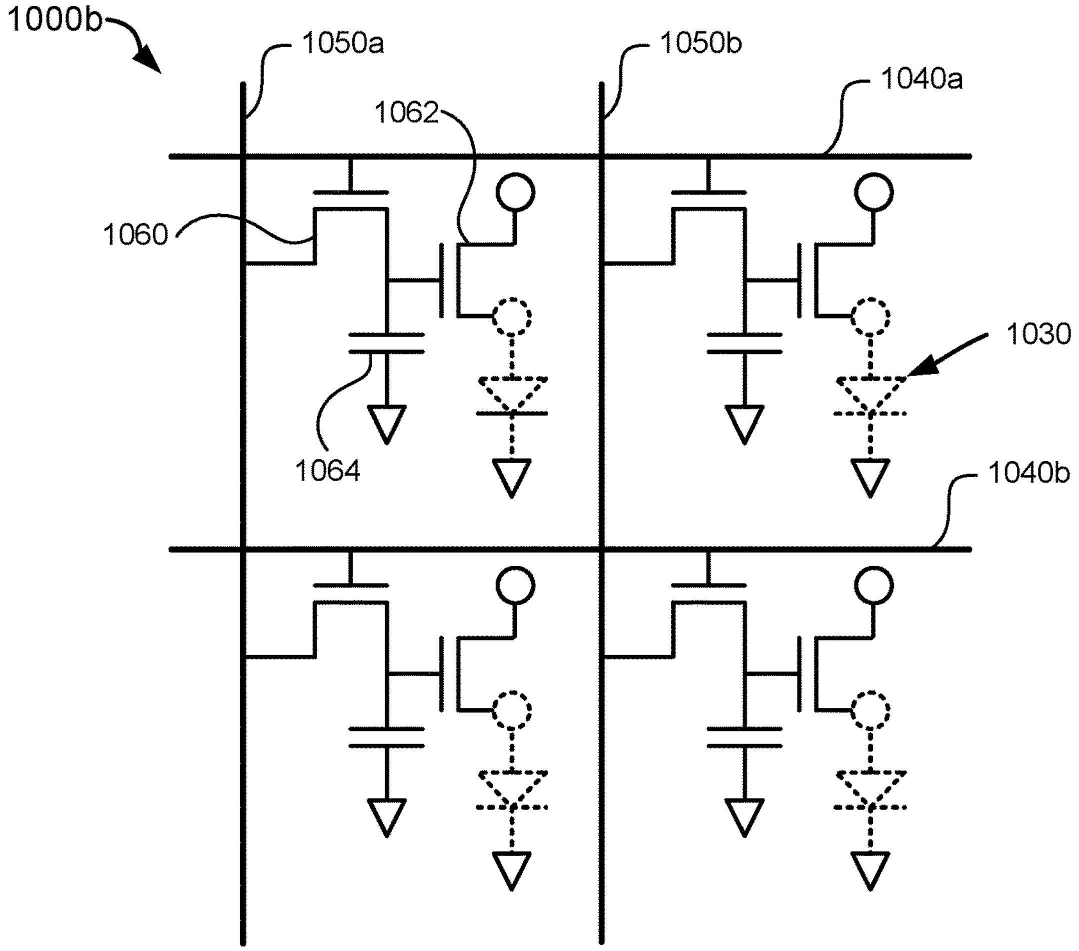
Figure 10C:
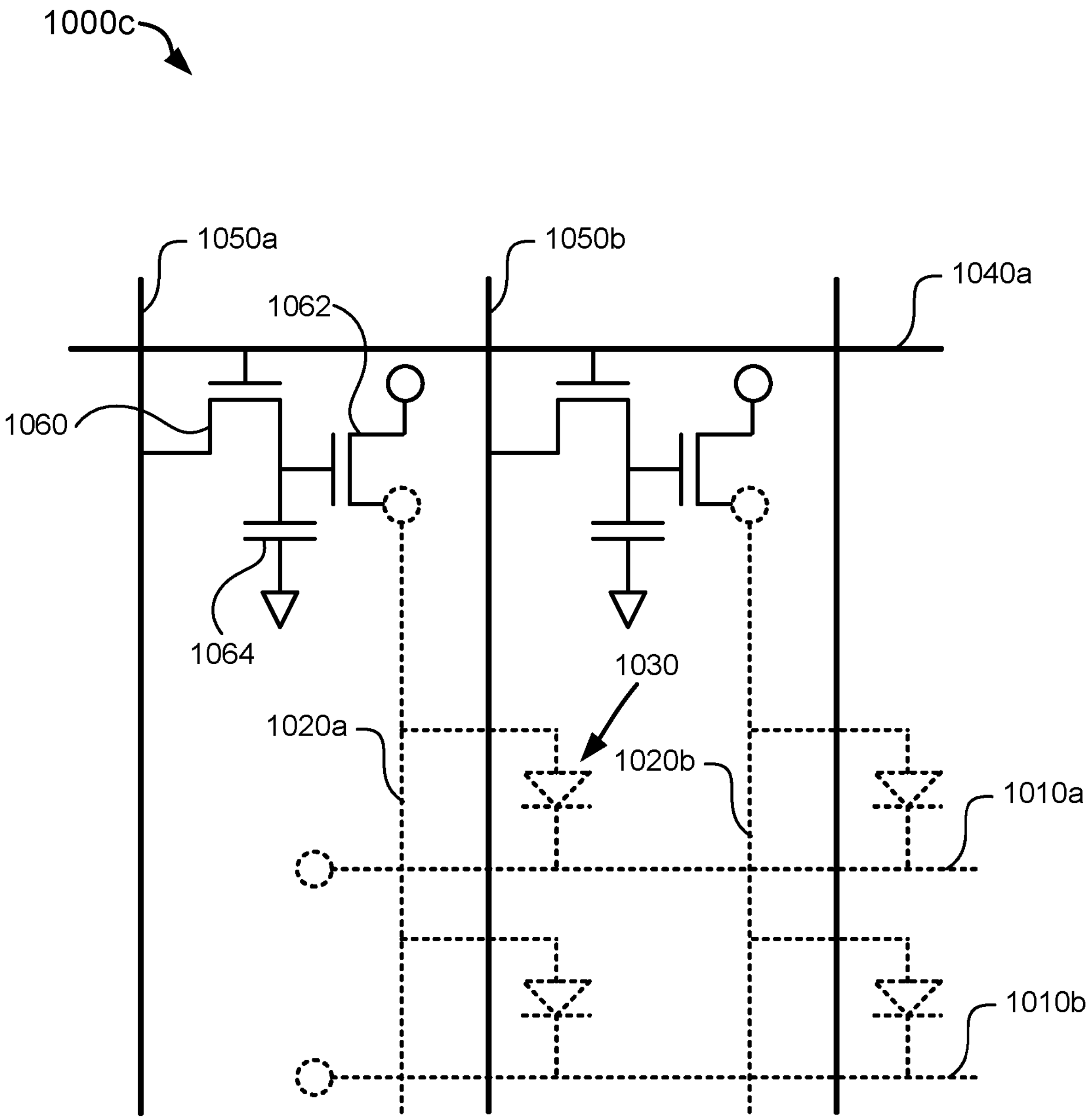

Diagrams 1000*a*, 1000*b*, and 1000*c* in FIGS. 10A-10C illustrate various examples of backplane addressing. In the diagram 1000*a*, a passive matrix configuration is shown that uses a row-by-row pixel scan. In this example, a pixel may refer to a sub-raxel or individual light emitting element as described above. The passive matrix configuration is shown in dotted lines to indicate that it would be fully implemented on the array of pixels of a display panel and not on the backplane of a display panel. This example shows multiple row selects 1010*a* and 1010*b*, multiple columns 1020*a* and 1020*b*, and multiple light emitting elements 1030 (e.g., LEDs) at the intersection of each row select and column.

For the passive matrix configuration, when an LED is used for the light emitting element 1030, there are no driver cells or contacts per LED, the contact geometry is row and column, there may be flicker on large displays, the peak current for the LED may be high, and there is no backplane matrix density. Moreover, the maximum LED duty cycle is $1/(Row_{view} \cdot Row_{pixel})$.

In the diagram 1000*b*, an active matrix configuration is shown where all pixels (e.g., sub-raxels) are driven all the time. The active matrix configuration is shown with light emitting elements 1030 in dotted lines to indicate that they would be fully implemented on the array of pixels of a display panel, while solid lines are used to indicate those elements that would be implemented on the backplane of a display panel. This example shows multiple row selects 1040*a* and 1040*b*, multiple columns 1050*a* and 1050*b*, and multiple light emitting elements 1030 (e.g., LEDs). Moreover, for each light emitting element 1030 a backplane unit cell is used. In this example, a simple AM backplane unit cell configuration like the one described above in connection with FIGS. 6A and 6B and having a 2T1C circuit is used. In this case, a transistor 1060 corresponds to the first switch 610, a capacitor 1064 corresponds to the storage element 620, and a transistor 1062 corresponds to the source 630. Other backplane unit cells, such as the ones described above, can also be used.

For the active matrix configuration, when an LED is used for the light emitting element 1030, there is a driver cell or contact per LED, the contact geometry is point and ground, there is no flicker, the peak LED current is low, and it has the highest backplane matrix density. Moreover, the maximum LED duty cycle is 1.

Finally, in the diagram 1000*c*, a proposed hybrid matrix configuration is shown. This configuration can be used with any type of display. When a light field display is considered, the picture elements or super-raxels can use an active matrix approach and the light emitting elements or sub-raxels within those picture elements can use a passive matrix approach. The hybrid matrix configuration is shown with light emitting elements 1030, columns 1020*a* and 1020*b*, and row selects 1010*a* and 1010*b* in dotted lines to indicate that they would be fully implemented on the array of pixels of a display panel, while solid lines are used to indicate those elements that would be implemented on the backplane of a display panel, including row select 1040*a* and columns 1050*a* and 1050*b*. Each columns of light emitting elements 1030 (e.g., LEDs) uses a backplane unit cell consisting, in this example, of the simple AM backplane unit cell with the transistor 1060, the capacitor, and the transistor 1062. Other backplane unit cells, such as the ones described above, can also be used.

For the hybrid matrix configuration, when an LED is used for the light emitting element 1030, there are $1/Row_{view}$ driver cells or contacts per LED, the contact geometry is row and column, there may be a slight flicker, the peak current for the LED may be medium, and the backplane matrix density is also medium. Moreover, the maximum LED duty cycle is $1/Row_{view}$.

Figure 11:
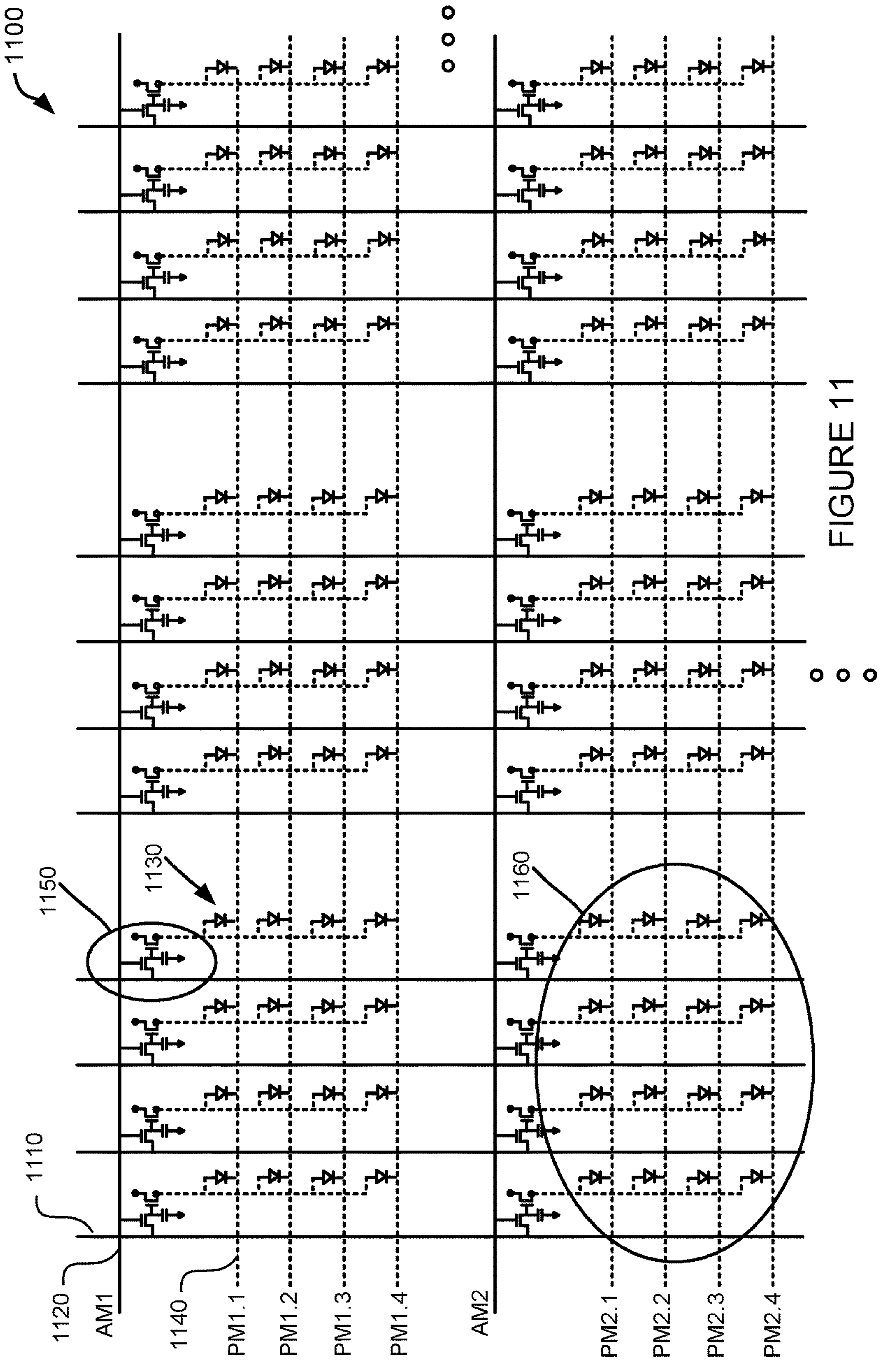
FIG. 11 illustrates an example of a backplane with a hybrid matrix topology, in accordance with aspects of this disclosure.

FIG. 11 shows a diagram 1100 with an example of a backplane with a hybrid matrix topology that follows the configuration shown in the diagram 1000*c* in FIG. 10C. Similar to the diagram 1000*c*, dotted lines indicate those elements or components that would be fully implemented on the array of pixels of a display panel, while solid lines are used to indicate those elements that would be implemented on the backplane of a display panel. In this example, multiple columns 1110 are shown for addressing light emitting elements 1130 (e.g., LEDs). The active matrix operation in the hybrid matrix topology, which is implemented in the backplane involves AM row selects 1120, such as AM1 and AM2. The passive matrix operation in the hybrid matrix topology, which is implemented in the array of light emitting elements 1130 involves PM row selects 1140, such as PM1.1, PM1.2, PM1.3, and PM1.4 associated with AM1 and PM2.1, PM2.2, PM2.3, and PM2.4 associated with AM2. The number of columns 1110, AM row selects 1120, and PM row selects 1140 are provided by way of illustration and not of limitation.

Also shown in the diagram 1100 is a backplane unit cell 11150, which can be any one of the backplane unit cells described above. A simple 2T1C backplane unit cell is shown for purposes of illustration and to maintain the hybrid matrix topology easy to read.

A group of light emitting elements 1160 corresponding to a group of columns 1110 and one of the AM row selects 1120, along with its corresponding PM row selects 1140, can correspond to the light emitting elements of a picture element (super-raxel), in which case the group 1160 is said to correspond to a picture element. Similarly, a group 1150 may correspond to less than a picture element (e.g., half or one quarter of the light emitting elements of a picture element) or to more than a picture element (e.g., one and a quarter, one and a half, twice a picture element).

In the example of the diagram 1100, each of the data columns and each of the row selects can be directly accessible via one or more edges of the backplane.

Figure 12A:
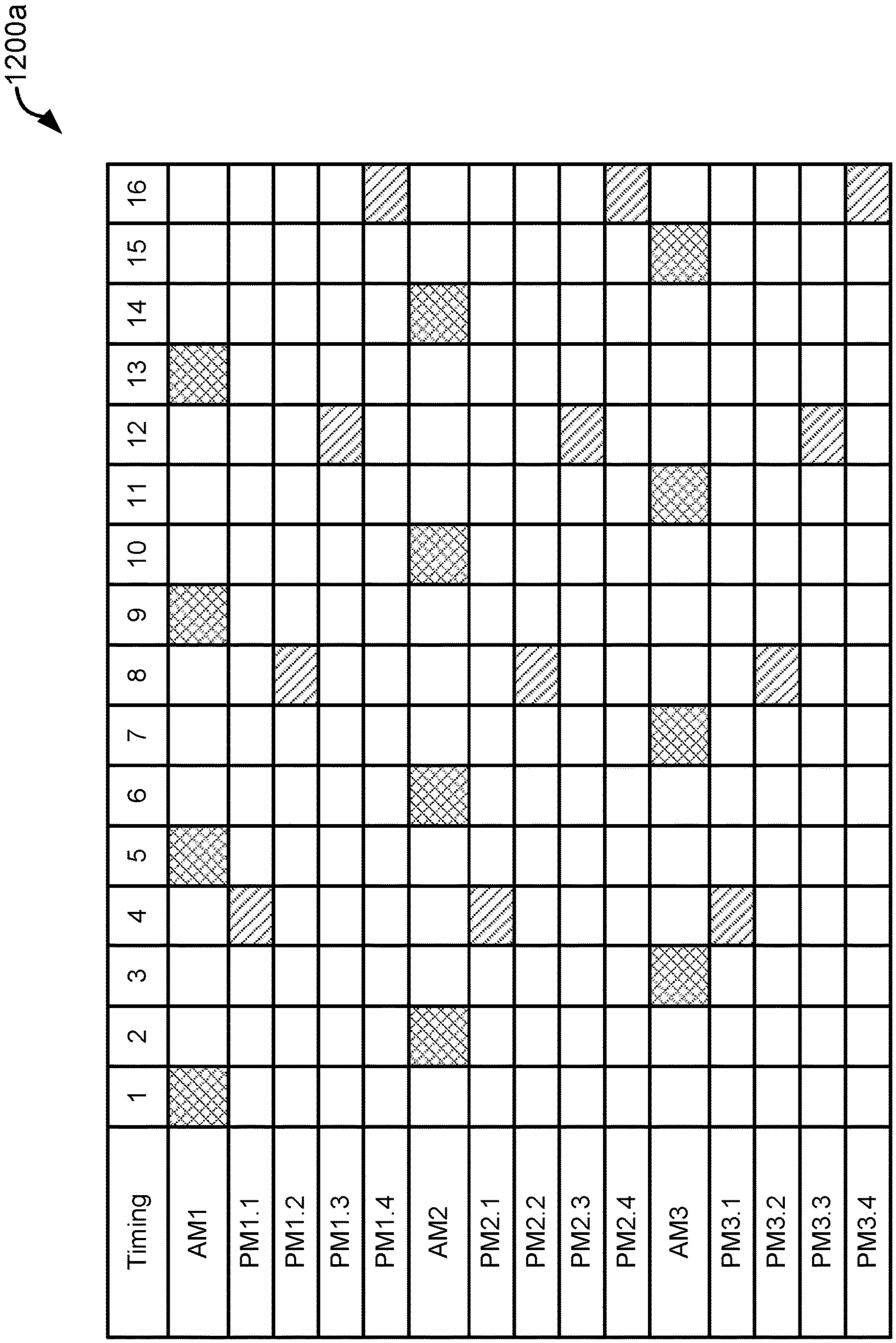
FIGS. 12A and 12B illustrate different examples of driving operations for a backplane with a hybrid topology, in accordance with aspects of this disclosure.
Figure 12B:
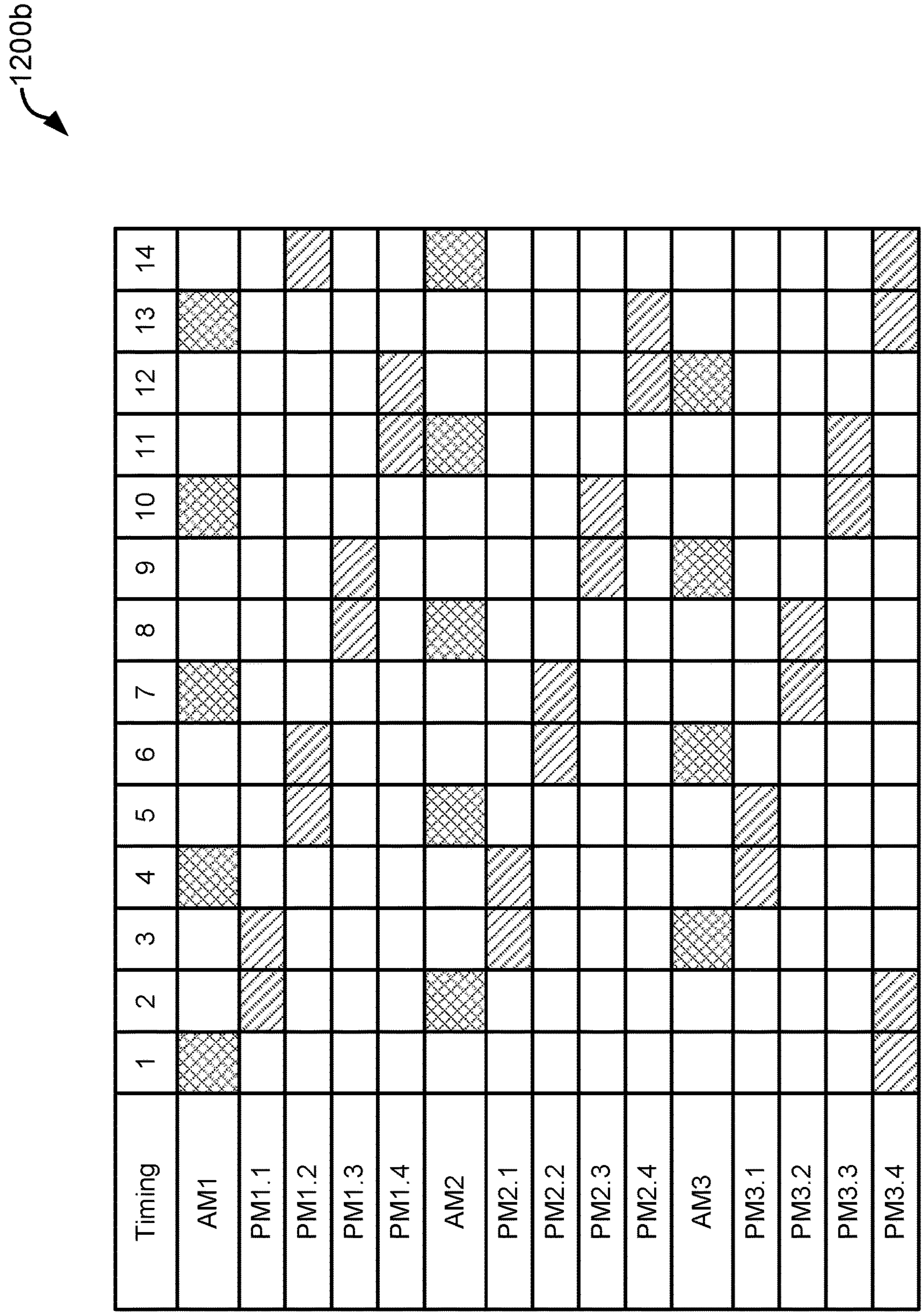

FIGS. 12A and 12B show diagrams 1200*a* and 1200*b* that illustrate different examples of driving operations for a backplane with a hybrid topology such as the one described in the diagram 1100 in FIG. 11.

The diagram 1200*a* is a timing diagram that illustrates one example of when the active matrix and passive matrix operations of the backplane hybrid topology can take place. In this case, the AM row selects (e.g., AM1, AM2, AM3) are offset from each other by one time unit and the PM row selects (e.g., PM1.1, PM2.1, PM3.1) take place at the same time. For example, AM1 is selected at time units 1, 5, 9, and 13 (cross hatch), AM2 is selected at time units 2, 6, 10, and 14 (cross hatch), and AM3 is selected at time units 3, 7, 11, and 15 (cross hatch).

After AM1, AM2, and AM3 are selected at time units 1, 2, and 3, respectively, PM1.1, PM2.1, and PM3.1 are selected at time unit 4 (diagonal lines). After AM1, AM2, and AM3 are selected at time units 5, 6, and 7, respectively, PM1.2, PM2.2, and PM3.2 are selected at time unit 8 (diagonal lines). After AM1, AM2, and AM3 are selected at time units 9, 10, and 11, respectively, PM1.3, PM2.3, and PM3.3 are selected at time unit 12 (diagonal lines). Finally, after AM1, AM2, and AM3 are selected at time units 13, 14, and respectively, PM1.4, PM2.4, and PM3.4 are selected at time unit 16 (diagonal lines). A similar approach to the one outlined in this timing diagram may be followed when there are more than three (3) AM row selects and more than four (4) PM row selects for each AM row select.

The diagram 1200*b* is a timing diagram that illustrates another example of when the active matrix and passive matrix operations of the backplane hybrid topology can take place. In this case, the AM row selects (e.g., AM1, AM2, AM3) are offset from each other by one time unit as are the PM row selects (e.g., PM1.1, PM2.1, PM3.1). For example, AM1 is selected at time units 1, 4, 7, 10, and 13 (cross hatch), AM2 is selected at time units 2, 5, 8, 11, and 14 (cross hatch), and AM3 is selected at time units 3, 6, 9, and 12 (cross hatch).

After AM1, AM2, and AM3 are selected at time units 1, 2, and 3, respectively, PM1.1, is selected at time units 2 and 3 (diagonal lines), PM2.1 is selected at times units 3 and 4 (diagonal lines), and PM3.1 are selected at time units 4 and 5 (diagonal lines). Similarly for the other selections of AM1, AM2, and AM3. In this approach, the PM row selects need not wait until all of the AM row selects have taken place. A similar approach to the one outlined in this timing diagram may be followed when there are more than three (3) AM row selects and more than four (4) PM row selects for each AM row select.

Figure 13A:
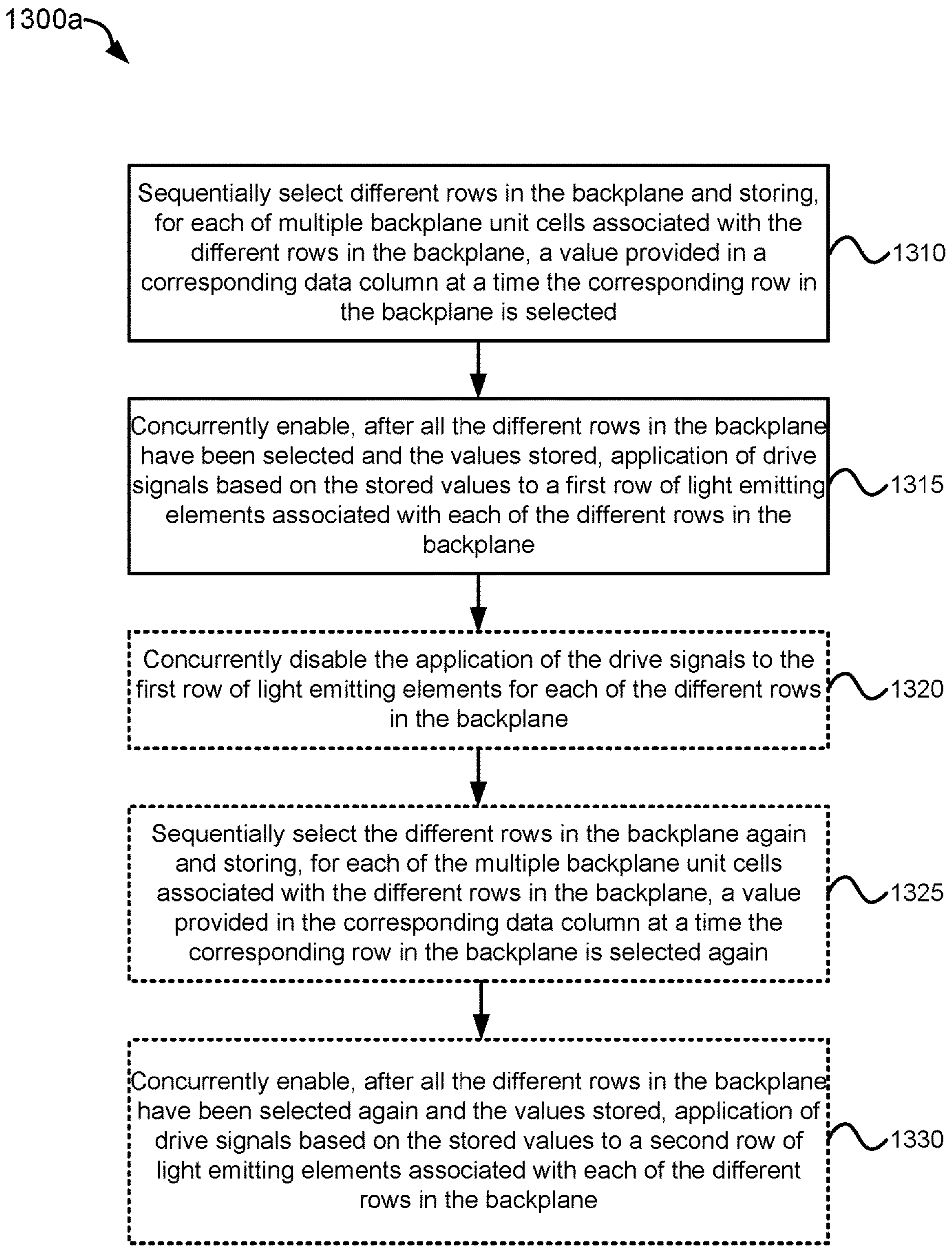
FIGS. 13A and 13B are flow charts that illustrate different methods of driving a backplane with a hybrid topology, in accordance with aspects of this disclosure.
Figure 13B:
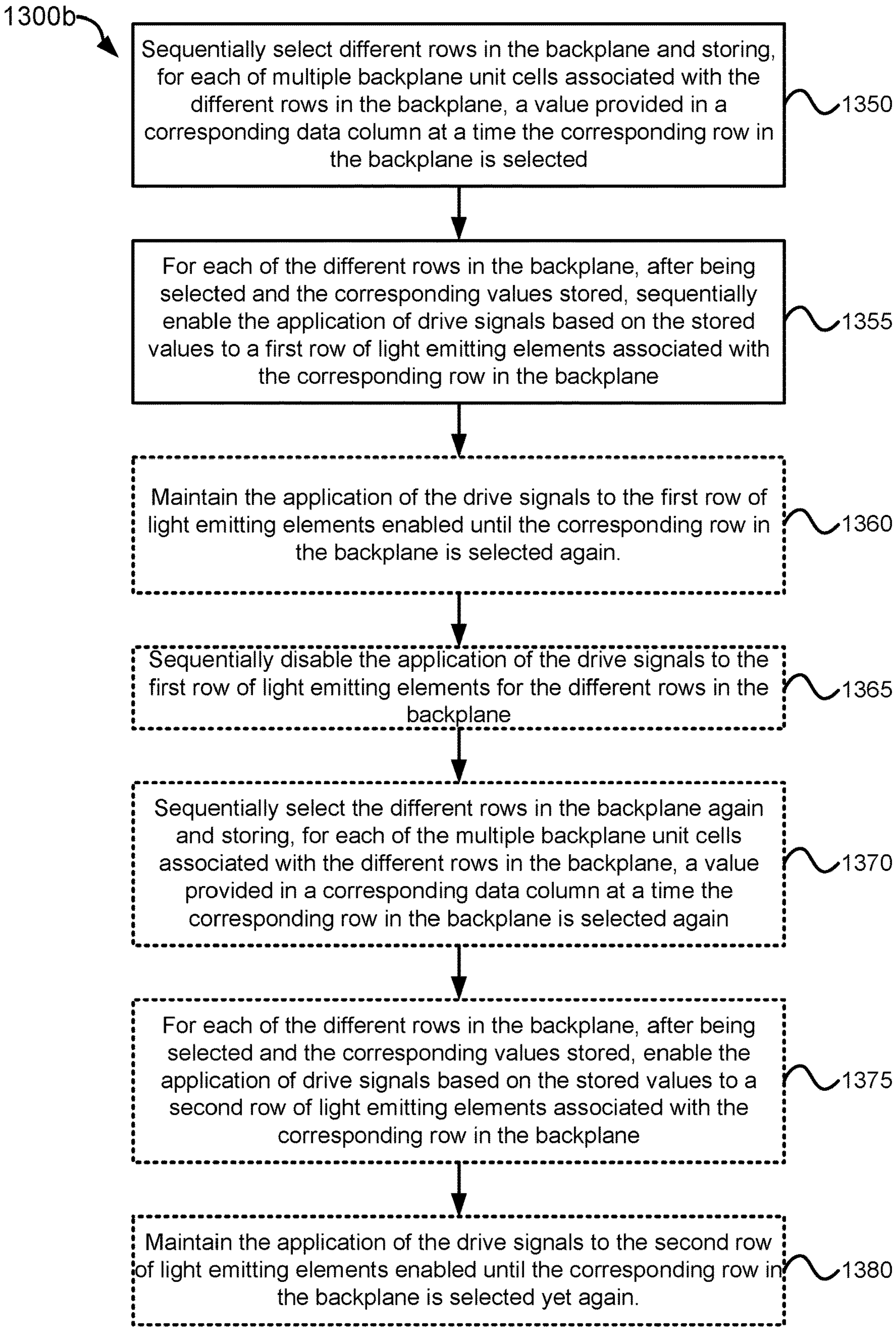

FIGS. 13A and 13B are flow charts that respectively illustrate methods 1300*a* and 1300*b* of driving a backplane with a hybrid topology using the driving operations described above in connection with the timing diagrams 1200*a* and 1200*b*.

The method 1300*a* is a method of operating a backplane to drive light emitting elements in a display where the backplane has a hybrid topology configuration. The method 1300*a* is based at least in part on the timing diagram 1200*a* in FIG. 12A.

At 1310, the method 1300*a* includes sequentially selecting different rows (e.g., AM1, AM2, and AM3) in the backplane and storing, for each of multiple backplane unit cells associated with the different rows in the backplane, a value provided in a corresponding data column at a time the corresponding row in the backplane is selected.

At 1315, the method 1300*a* includes concurrently enabling, after all the different rows in the backplane have been selected and the values stored, application of drive signals based on the stored values to a first row of light emitting elements (e.g., rows selected with PM1.1, PM2.1, and PM3.1) associated with each of the different rows in the backplane.

In an aspect, the method 1300*a* may include, at 1320, concurrently disabling the application of the drive signals to the first row of light emitting elements for each of the different rows in the backplane. The method 1300*a* may also include, at 1325, sequentially selecting the different rows in the backplane again and storing, for each of the multiple backplane unit cells associated with the different rows in the backplane, a value provided in the corresponding data column at a time the corresponding row in the backplane is selected again. The method 1300*a* may further include, at 1330, concurrently enabling, after all the different rows in the backplane have been selected again and the values stored, application of drive signals based on the stored values to a second row of light emitting elements associated with each of the different rows in the backplane. The first row of light emitting elements and the second row of light emitting elements may be part of a subset of rows of light emitting elements in the display. The first row of light emitting elements and the second row of light emitting elements in the subset are correspondingly different from a first physical row of light emitting elements and a second physical row of light emitting elements in the display.

The method 1300*a* may further include for each of remaining rows of light emitting elements after the first row of light emitting elements in a set of rows of light emitting elements associated with each of the different rows in the backplane, performing concurrently disabling the application of drive signals to a previous row of light emitting elements, sequentially selecting the different rows in the backplane again and storing, for each of the multiple backplane unit cells associated with the different rows in the backplane, a value provided in the corresponding data column at a time the corresponding row in the backplane is selected again, and concurrently enabling, after all the different rows in the backplane have been selected again and the values stored, application of drive signals based on the stored values to a current row of light emitting elements associated with each of the different rows in the backplane.

In another aspect, a period of time during which the application of the drive signals is enabled is longer than a period of time during which each row in the backplane is selected.

The method 1300*b* is another method of operating a backplane to drive light emitting elements in a display where the backplane has a hybrid topology configuration. The method 1300*b* is based at least in part on the timing diagram 1200*b* in FIG. 12B.

At 1350, the method 1300*b* includes sequentially selecting different rows (e.g., AM1, AM2, and AM3) in the backplane and storing, for each of multiple backplane unit cells associated with the different rows in the backplane, a value provided in a corresponding data column at a time the corresponding row in the backplane is selected.

At 1355, the method 1300*b* includes, for each of the different rows in the backplane, after being selected and the corresponding values stored, sequentially enabling the application of drive signals based on the stored values to a first row of light emitting elements (e.g., rows selected with PM1.1, PM2.1, and PM3.1) associated with the corresponding row in the backplane.

In an aspect, the method 1300*b* includes, at 1360, maintaining the application of the drive signals to the first row of light emitting elements enabled until the corresponding row in the backplane is selected again.

In another aspect, the method 1300*b* may include, at 1365, sequentially disabling the application of the drive signals to the first row of light emitting elements for the different rows in the backplane. The method 1300*b* may also include, at 1370, sequentially selecting the different rows in the backplane again and storing, for each of the multiple backplane unit cells associated with the different rows in the backplane, a value provided in a corresponding data column at a time the corresponding row in the backplane is selected again. The method 1300*b* may further include, at 1375, for each of the different rows in the backplane, after being selected and the corresponding values stored, enabling the application of drive signals based on the stored values to a second row of light emitting elements associated with the corresponding row in the backplane. Moreover, the method 1300*b* may also include, at 1380, maintaining the application of the drive signals to the second row of light emitting elements enabled until the corresponding row in the backplane is selected yet again. The first row of light emitting elements and the second row of light emitting elements may be part of a subset of rows of light emitting elements in the display. The first row of light emitting elements and the second row of light emitting elements in the subset are correspondingly different from a first physical row of light emitting elements and a second physical row of light emitting elements in the display.

The method 1300*b* may further include, for each of remaining rows of light emitting elements after the first row of light emitting elements in a set of rows of light emitting elements associated with each of the different rows in the backplane, performing sequentially disabling the application of drive signals to a previous row of light emitting elements for the different rows in the backplane, sequentially selecting the different rows in the backplane again and storing, for each of the multiple backplane unit cells associated with the different rows in the backplane, a value provided in a corresponding data column at a time the corresponding row in the backplane is selected again, and for each of the different rows in the backplane, after being selected again and the corresponding values stored, enabling the application of drive signals based on the stored values to a current row of light emitting elements associated with the corresponding row in the backplane.

The present disclosure describes various techniques and devices that enable backplanes that can have low-power consumption and high operating bandwidth for use with high resolution displays, such as light field displays.

Accordingly, although the present disclosure has been provided in accordance with the implementations shown, one of ordinary skill in the art will readily recognize that there could be variations to the embodiments and those variations would be within the scope of the present disclosure. Therefore, many modifications may be made by one of ordinary skill in the art without departing from the scope of the appended claims.

The invention claimed is:

1. An apparatus, comprising:
- a first switch coupled to a column input and configured to be controlled via a row input;
- a capacitor switchably coupled to the column input via the first switch;
- a comparator configured to compare an output of the first switch and a reference signal;
- a second switch configured to be controlled by a comparator output of the comparator; and
- a light emitting element configured to be driven by an output of the second switch, the light emitting element is switchably coupled to a power signal via the second switch, the power signal is a monotonically increasing signal.

2. The apparatus of claim 1, wherein the capacitor has a voltage defined by the output of the first switch.

3. The apparatus of claim 1, wherein the reference signal is a monotonically increasing signal.

4. The apparatus of claim 1, wherein the first switch is configured to be closed in response to a row select signal on the row input.

5. The apparatus of claim 4, wherein the capacitor is charged to a value of the column input in response to the row select signal on the row input.

6. The apparatus of claim 1, wherein the second switch is configured to be opened in response to the reference signal exceeding a voltage of the capacitor.

7. The apparatus of claim 6, wherein the light emitting element is switchably coupled to a power signal via the second switch, the output of the second switch follows the power signal until the second switch is opened in response to the comparator output.

8. The apparatus of claim 6, wherein the light emitting element is switchably coupled to a power signal via the second switch, the output of the second switch follows the power signal until the second switch is opened in response to the reference signal exceeding a voltage of the capacitor.

9. An apparatus, comprising:
- a first switch coupled to a column input and configured to be controlled via a row input;
- a capacitor switchably coupled to the column input via the first switch;
- a comparator configured to compare an output of the first switch and a reference signal;
- a second switch configured to be controlled by a comparator output of the comparator; and
- a light emitting element coupled to the second switch via a source, the light emitting element being switchably coupled to a power signal via the second switch, the power signal having a non-linear profile.

10. The apparatus of claim 9, wherein the source is a current source or a voltage source.

11. The apparatus of claim 9, wherein the capacitor has a voltage defined by the output of the first switch.

12. The apparatus of claim 9, wherein the first switch is configured to be closed in response to a row select signal on the row input.

13. The apparatus of claim 12, wherein the capacitor is charged to a value of the column input in response to the row select signal on the row input.

14. The apparatus of claim 9, wherein the second switch is configured to be opened in response to the reference signal exceeding a voltage of the capacitor.

15. The apparatus of claim 14, wherein the light emitting element is switchably coupled to a power signal via the second switch, the output of the second switch follows the power signal until the second switch is opened in response to the reference signal exceeding the voltage of the capacitor.

16. An apparatus, comprising:

a column input;

a row input; and a light emitting element configured to be controlled based on a reference signal and a power signal, the reference signal being compared by a comparator with a column signal on the column input, the power signal being switchably provided to the light emitting element based on a comparator output of the comparator, the power signal having a non-linear profile.

17. The apparatus of claim 16, wherein the column signal is provided to the comparator via a switch switchably controlled by a row signal on the row input.

18. The apparatus of claim 16, wherein the power signal is switchably provided to the light emitting element using a switch.

* * * * *